US010830864B2

(12) United States Patent
Daehler

(10) Patent No.: US 10,830,864 B2
(45) Date of Patent: Nov. 10, 2020

(54) SYSTEM AND METHOD FOR IDENTIFYING AND TRACKING UNACKNOWLEDGED MARINE VESSELS

(71) Applicant: The Boeing Company, Chicago, IL (US)

(72) Inventor: Erik S. Daehler, Long Beach, CA (US)

(73) Assignee: The Boeing Company, Chicago, IL (US)

( * ) Notice: Subject to any disclaimer, the term of this patent is extended or adjusted under 35 U.S.C. 154(b) by 663 days.

(21) Appl. No.: 14/964,565

(22) Filed: Dec. 9, 2015

(65) Prior Publication Data

US 2017/0168133 A1 Jun. 15, 2017

(51) Int. Cl.
*G01S 5/00* (2006.01)
*G01S 5/02* (2010.01)
*G08G 3/00* (2006.01)

(52) U.S. Cl.
CPC .......... *G01S 5/0263* (2013.01); *G01S 5/0036* (2013.01); *G08G 3/00* (2013.01)

(58) Field of Classification Search
CPC ................................ G01S 5/0263; G08G 3/00
USPC .......................................................... 342/451
See application file for complete search history.

(56) References Cited

U.S. PATENT DOCUMENTS 6,236,939 B1 * 5/2001 Wu ........................ B64G 1/361
244/164
7,414,573 B2 8/2008 Murphy
7,809,370 B2 10/2010 Stolte et al.
2009/0161797 A1 6/2009 Cowles et al.
2013/0200207 A1 8/2013 Pongratz et al.
2014/0218242 A1* 8/2014 Platzer .................. G01S 5/0027
342/454

FOREIGN PATENT DOCUMENTS

WO 2007143478 A2 12/2007

OTHER PUBLICATIONS

Dekker, "Maritime Situation Awareness Capabilities from Satellite and Terrestrial Sensor Systems", Paper presented at MAST (Maritime Systems and Technology) Europe Conference. (Year: 2013).*

(Continued)

*Primary Examiner* — Erin F Heard
*Assistant Examiner* — Helena H Seraydaryan

(57) ABSTRACT

A system and a method for identifying and tracking unacknowledged marine vessels. The system includes a sensing system having one or more observation platforms positioned remotely above one or more marine vessels, each with a navigation system, and one or more payloads coupled to the observation platform(s). The payloads have one or more optical receivers to observe, geolocate, and receive optical emissions from the marine vessels to detect optical signatures. The payloads have one or more AIS receivers to observe, geolocate, and receive AIS emissions from the marine vessels to detect AIS signatures. The payloads have one or more RF receivers to receive RF emissions from the marine vessels to detect RF signatures. The payloads have at least one processor with an analysis software to process and analyze the optical, AIS, and RF signatures, to identify and track one or more unacknowledged marine vessels from the marine vessels.

20 Claims, 10 Drawing Sheets

(56) References Cited

OTHER PUBLICATIONS

Kuhl, "Combined Earth-Star Sensor for Attitude and Orbit Determination of Geostationary Satellites." (Year: 2005).*
Beveridge, "Approximate Image Mapping Between Nearly Boresight Aligned Optical and Range Sensors" (Year: 1996).*
Borghi, "Star Detection and Tracking using CCDs", IFAC Proceedings Volumes, vol. 16, Issue 11, 1983, pp. 289-295). (Year: 1983).*
European Patent Office (EPO) Partial Search Report and Provisional Opinion for Counterpart EP Application No. 16202951.6, dated May 31, 2017, Applicant The Boeing Company, 14 pages.
State Intellectual Property Office (SIPO) China Notification of First Office Action and Search Report, English and Chinese Versions, for Counterpart CN Application No. 2016110593820, dated Aug. 30, 2019, Applicant The Boeing Company, 19 pages.
The State Intellectual Property Office (SIPO) of the People's Republic of China, Notification of the Second Office Action, English and Chinese Versions, for Counterpart CN Application No. 2016110593820, dated Jun. 10, 2020, Applicant The Boeing Company, 9 pages.

* cited by examiner

SYSTEM AND METHOD FOR IDENTIFYING AND TRACKING UNACKNOWLEDGED MARINE VESSELS

BACKGROUND

1) Field of the Disclosure

The disclosure relates generally to systems and methods for identifying and tracking marine vessel traffic, and more particularly, to space-based and air-based systems and methods for identifying and tracking marine vessels via analysis of optical, automatic identification system (AIS), and radio frequency (RF) signatures.

2) Description of Related Art

Marine vessel traffic, such as international marine vessels, cargo ships above certain weights, and passenger ships of any size are required to use an Automatic Identification System (AIS) and carry AIS equipment, such as AIS transceivers, transponders, or terminals, for identifying, locating, and tracking such marine vessel traffic by electronically exchanging information with AIS base stations, satellites, and other nearby marine vessels. The information or messages provided by AIS equipment includes, for example, a marine vessel's unique identification tracking number, position of the marine vessel (e.g., latitude and longitude), a course the marine vessel is traveling, speed of the marine vessel, dimensions of the marine vessel, and other information concerning the marine vessel.

Marine vessel traffic may be identified and tracked by using AIS signal beacons or AIS signals emitted by the AIS equipment onboard the marine vessel and received by an AIS receiver. Known systems and methods exist that use satellite-based AIS receivers to globally identify and track ocean going marine vessel traffic. However, such known systems and methods may only use satellite-based AIS receivers to globally identify and track ocean going marine vessel traffic and may not discover or identify unacknowledged marine vessels.

Unacknowledged marine vessels are those marine vessels that may not carry or have AIS or AIS equipment, may turn off or deactivate the AIS or AIS equipment on the marine vessel, may deliberately change or tamper with its AIS information, or may spoof or fake AIS signal beacons or AIS signals from the marine vessel. For example, such unacknowledged marine vessels may not always use the AIS equipment, and thus do not emit an AIS signal, particularly when performing illegal activities, such as human smuggling, illegal fishing, arms transportation, or other illegal activities.

Thus, such known systems and methods that may only use satellite-based AIS receivers to globally identify and track ocean going marine vessels may increase the uncertainty in tracking marine vessels and may not discover or identify unacknowledged marine vessels.

In addition, known systems and methods for globally identifying and tracking ocean going marine vessels do not use AIS receivers, radio frequency (RF) receivers, and optical receivers together, or in an integrated manner, to detect AIS signatures, RF signatures, and optical signatures of the marine vessels, and in turn, to identify and track unacknowledged marine vessels.

Accordingly, there is a need in the art for an improved system and method for identifying and tracking unacknowledged marine vessels that provide advantages over known systems and methods for identifying and tracking such vessels.

SUMMARY

This need for an improved system and method for identifying and tracking unacknowledged marine vessels is satisfied by this disclosure. As discussed in the below detailed description, embodiments of the improved system and method for identifying and tracking unacknowledged marine vessels may provide significant advantages over existing systems and methods.

In an embodiment of the disclosure, there is provided a system for identifying and tracking unacknowledged marine vessels. The system comprises a sensing system. The sensing system comprises one or more observation platforms positioned remotely above one or more marine vessels on water. The one or more observation platforms each have a navigation system.

The sensing system further comprises one or more payloads coupled to each of the one or more observation platforms. The one or more payloads comprise one or more optical receivers configured to observe, geolocate, and receive optical emissions from the one or more marine vessels to detect optical signatures. The one or more payloads further comprise one or more automatic identification system (AIS) receivers configured to observe, geolocate, and receive automatic identification system (AIS) emissions from the one or more marine vessels to detect AIS signatures. The one or more payloads further comprise one or more radio frequency (RF) receivers configured to receive radio frequency (RF) emissions from the one or more marine vessels to detect RF signatures.

The one or more payloads further comprise at least one processor with an analysis software configured to process and analyze the optical signatures, the AIS signatures, and the RF signatures, to identify and track one or more unacknowledged marine vessels from the one or more marine vessels.

In another embodiment of the disclosure, there is provided a system for identifying and tracking unacknowledged marine vessels via analysis of optical signatures, automatic identification system (AIS) signatures, and radio frequency (RF) signatures. The system comprises a sensing system.

The sensing system comprises one or more observation platforms positioned remotely above one or more marine vessels on water. The one or more observation platforms each have a navigation system. The one or more observation platforms comprise one or more spaceborne observation platforms, one or more airborne observation platforms, or a combination thereof.

The sensing system further comprises one or more payloads coupled to the one or more observation platforms. The one or more payloads comprise one or more optical receivers comprising a star tracker or a star tracker array. Each optical receiver is configured to observe, geolocate, and receive optical emissions from the one or more marine vessels to detect optical signatures.

The one or more payloads further comprise an integrated AIS/RF receiver (80) comprising one or more automatic identification system (AIS) receivers configured to observe, geolocate, and receive automatic identification system (AIS) emissions from the one or more marine vessels to detect AIS signatures, and further comprising one or more radio frequency (RF) receivers configured to receive radio frequency (RF) emissions from the one or more marine vessels to detect RF signatures. The one or more payloads further comprise one or more transmitters configured to transmit payload data transmission for the optical signatures, the AIS signatures, and the RF signatures, from the one or more payloads of the sensing system.

The system further comprises one or more earth-based stations having one or more earth-based receivers configured to receive the payload data transmission from the one or more payloads of the sensing system. The system further comprises one or more computers with an analysis software, configured to process and analyze the optical signatures, the AIS signatures, and the RF signatures, to identify and track one or more unacknowledged marine vessels from the one or more marine vessels.

In another embodiment of the disclosure, there is provided a computer implemented method for identifying and tracking one or more unacknowledged marine vessels. The method comprises the step of positioning a sensing system remotely above one or more marine vessels on water.

The sensing system comprises one or more observation platforms, each having a navigation system. The one or more observation platforms comprise one or more spaceborne observation platforms, one or more airborne observation platforms, or a combination thereof.

The sensing system further comprises one or more payloads coupled to each of the one or more observation platforms. The one or more payloads comprise a receiver assembly of one or more optical receivers, one or more automatic identification system (AIS) receivers, and one or more radio frequency (RF) receivers. The one or more payloads further comprise one or more computers having an analysis software, and one or more transmitters.

The method further comprises the step of using the receiver assembly of the sensing system to simultaneously observe, receive, and geolocate one or more optical emissions, one or more automatic identification system (AIS) emissions, and one or more radio frequency (RF) emissions, from the one or more marine vessels, to detect one or more optical signatures, one or more automatic identification system (AIS) signatures, and one or more radio frequency (RF) signatures.

The method further comprises the step of using the one or more computers, and the analysis software, of the sensing system to process and analyze the one or more optical signatures, the one or more automatic identification system (AIS) signatures, and the one or more radio frequency (RF) signatures, to identify and track one or more unacknowledged marine vessels (30b) from the one or more marine vessels.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein.

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and will fully convey the scope of the disclosure to those skilled in the art.

Figure 1:
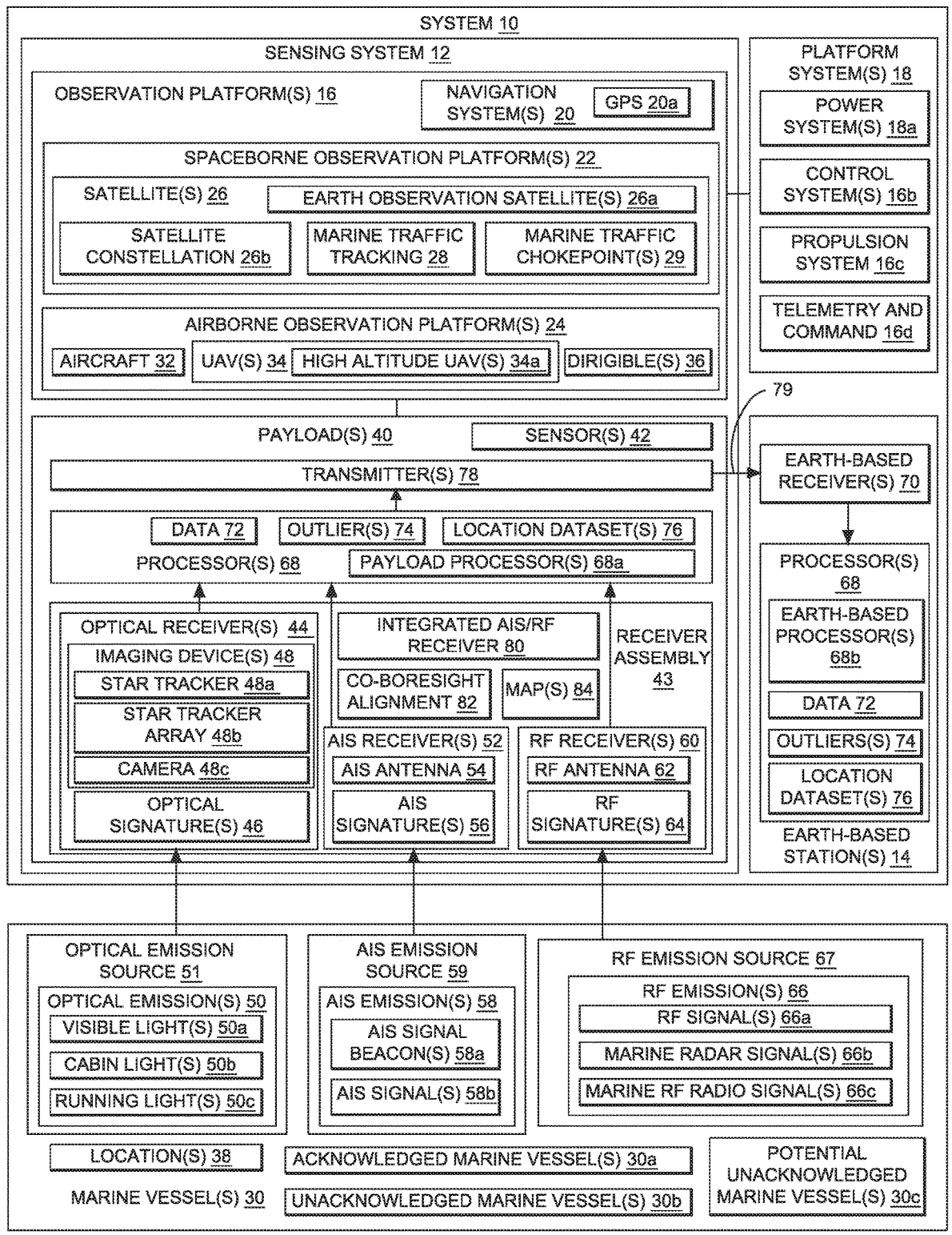
FIG. 1 is an illustration of a block diagram of embodiments of a system and a sensing system of the disclosure.

Now referring to the Figures, FIG. 1 is an illustration of a block diagram of an embodiment of a system 10 and a sensing system 12 of the disclosure. In one embodiment of the disclosure, there is provided the system 10 for identifying and tracking one or more unacknowledged marine vessels 30b (see FIG. 1) from one or more marine vessels 30 (see FIG. 1) on water 86 (see FIG. 2). The sensing system 12 is preferably space-based and/or air-based.

The marine vessels 30 (see FIG. 1) or marine traffic may include international marine vessels, cargo ships above certain weights, passenger ships of any size, and any other ships, boats, liners, watercrafts, or other marine transport vessels that are required to use an Automatic Identification System (AIS) and carry AIS equipment, such as AIS transceivers, AIS transponders, or AIS terminals, for identifying, locating, and tracking such marine vessels by electronically exchanging information with AIS base stations, satellites, and other nearby marine vessels. The marine vessels 30 (see FIG. 1) are preferably traveling and positioned at one or more locations 38 (see FIG. 1) on water 86 (see FIG. 2), such as on the ocean, on the sea, or on another suitable body of marine water. The marine vessels 30 (see FIG. 1) comprise acknowledged marine vessels 30a (see FIG. 1) and unacknowledged marine vessels 30b (see FIG. 1).

As used herein, "unacknowledged marine vessel" means a marine vessel that does not carry or have an Automatic Identification System (AIS) automatic tracking system or AIS equipment, such as an AIS transceiver, an AIS transponder, or an AIS terminal, a marine vessel that has turned off or deactivated its AIS equipment, a marine vessel where the AIS information has been deliberately changed or tampered with, and/or a marine vessel that emits a spoofed or fake AIS signal beacon or AIS signal from the marine vessel. As discussed above, the information provided by AIS includes, for example, a marine vessel's unique identification tracking number, position of the marine vessel (e.g., latitude and longitude), a course the marine vessel is traveling, speed of the marine vessel, dimensions of the marine vessel, and other information concerning the marine vessel.

As shown in FIG. 1, the system 10 comprises the sensing system 12. The sensing system 12 (see FIG. 1) comprises one or more observation platforms 16 (see FIG. 1) that may preferably be positioned in air 88 (see FIG. 2) or in space 89 (see FIG. 2), remotely above the one or more marine vessels 30 (see FIGS. 1, 2) on water 86 (see FIG. 2).

The one or more observation platforms 16 (see FIG. 1) preferably comprise one or more navigation systems 20 (see FIG. 1), for example, a global positioning system (GPS) 20a (see FIG. 1), or other suitable navigation system. Preferably, each observation platform 16 (see FIG. 1) has a navigation system 20 (see FIG. 1) that is computerized to compute the relative position and direction of the observation platform 16 and to have a reference position to earth from the observation platform 16.

As shown in FIG. 1, the one or more observation platforms 16 may comprise one or more spaceborne observation platforms 22, one or more airborne observation platforms 24, or a combination thereof, of the one or more spaceborne observation platforms 22 and the one or more airborne observation platforms 24. As further shown in FIG. 1, the one or more observation platforms 16, such as in the form of one or more spaceborne observation platforms 22, may comprise one or more of a satellite 26, including an earth observation satellite 26a, a satellite constellation 26b (i.e., a group of multiple satellites), or another suitable spaceborne observation platform 22. As discussed in more detail below, the system 10 (see FIG. 1) may use a satellite constellation 26b (see FIG. 1), such as a group of satellites 26, for marine traffic tracking 28 (see FIG. 1), of marine vessels 30 (see FIG. 1), such as at marine traffic chokepoints 29 (see FIG. 1).

As further shown in FIG. 1, the one or more observation platforms 16, such as in the form of one or more airborne observation platforms 24, may comprise one or more of an aircraft 32, an unmanned air vehicle (UAV) 34, including a high altitude UAV 34a, a dirigible 36 (i.e., a powered, steerable, and non-free floating airship inflated with a gas that is lighter than air), or another suitable airborne observation platform 24 or vehicle that is capable of traveling at flight altitudes (for example, 20,000 feet, or more, above sea level). The airborne observation platform 24 (see FIG. 1) may be either manned or unmanned.

As further shown in FIG. 1, the one or more observation platforms 16 may comprise one or more platform systems 18, such as one or more power systems 18a, one or more control systems 18b, a propulsion system 18c, a telemetry and command system 16d, and other suitable components and systems. The one or more power systems 18a (see FIG. 1) provide power to operate components within the one or more observation platforms 16 (see FIG. 1). The one or more control systems 16b (see FIG. 1) provide control and coordination between all of the systems of the observation platform 16 (see FIG. 1) and may include thermal and temperature controls for heating and cooling components of the observation platform 16 (see FIG. 1). The propulsion system 18c (see FIG. 1) drives and helps position the observation platform 16 (see FIG. 1). The telemetry and command system 16d (see FIG. 1) monitors and directs other systems in the observation platform 16 (see FIG. 1) via an automated communications process.

As shown in FIG. 1, the sensing system 12 further comprises one or more payloads 40 coupled to, or hosted on, each of the one or more observation platforms 16. The one or more payloads 40 (see FIG. 1) comprise one or more sensors 42 (see FIG. 1), including sensors 42 (see FIG. 1) in the receiver assembly 43 (see FIG. 1). As shown in FIG. 1, the receiver assembly 43 (see FIG. 1) comprises one or more optical receivers 44, one or more automatic identification system (AIS) receivers 52, and one or more radio frequency (RF) receivers 60. The one or more automatic identification system (AIS) receivers 52 (see FIG. 1) and one or more radio frequency (RF) receivers 60 (see FIG. 1) may be integrated into an integrated AIS/RF receiver 80 (see FIG. 1).

As shown in FIG. 1, the one or more payloads 40 comprise one or more optical receivers 44, each configured to observe, geolocate, and receive one or more optical emissions 50 from the one or more marine vessels 30, to detect one or more optical signatures 46. As further shown in FIG. 1, the one or more optical receivers 44 are preferably imaging devices 48 comprising one or more of a star tracker 48a, a star tracker array 48b, a camera 48c, or another suitable imaging device 48. The star tracker 48a (see FIG. 1) is discussed in more detail below with respect to FIG. 3B. As further shown in FIG. 1, an optical emission source 51 on the one or more marine vessels 30 emits one or more optical emissions 50 comprising one or more of visible lights 50a, cabin lights 50b, running lights 50c, or another suitable optical emission 50, on the one or more marine vessels 30. The one or more optical emissions 50 (see FIG. 1) are emitted from the one or more marine vessels 30 (see FIG. 1) and are observed, geolocated, and received by the one or more optical receivers 44 (see FIG. 1), in order to detect one or more optical signatures 46 (see FIG. 1).

As shown in FIG. 1, the one or more payloads 40 further comprise one or more automatic identification system (AIS) receivers 52, each configured to observe, geolocate, and receive one or more automatic identification system (AIS) emissions 58 from the one or more marine vessels 30, to detect one or more automatic identification system (AIS) signatures 56. As further shown in FIG. 1, the one or more AIS receivers 52 each have an automatic identification system (AIS) antenna 54 and other suitable known components. As further shown in FIG. 1, an automatic identification system (AIS) emission source 59 on the one or more marine vessels 30 emits one or more AIS emissions 58 comprising one or more automatic identification system (AIS) signal beacons 58a or automatic identification system (AIS) signals 58b, from the one or more marine vessels 30. The one or more AIS emissions 58 (see FIG. 1) are emitted from the one or more marine vessels 30 (see FIG. 1) and are observed, geolocated, and received by the one or more AIS receivers 52 (see FIG. 1), in order to detect one or more AIS signatures 56 (see FIG. 1). The AIS receiver 52 (see FIG. 1) preferably comprises one or more known AIS receivers, for example, those having a VHF (very high frequency) waveband range of RF electromagnetic waves from 30-300 MHz (MegaHertz) with corresponding wavelengths in a range of 10 meters to 1 meter, and more preferably, having a waveband range of 156-162 MHz (MegaHertz). However, other suitable waveband ranges may be used. AIS signals travel much further vertically, and a space-based or spaceborne AIS receiver provides the capability of tracking global marine vessels or traffic from space.

As shown in FIG. 1, the one or more payloads 40 further comprise one or more radio frequency (RF) receivers 60, each configured to observe, geolocate, and receive one or more radio frequency (RF) emissions 66 from the one or more marine vessels 30, to detect one or more radio frequency (RF) signatures 64. As further shown in FIG. 1, the one or more RF receivers 60 each have a radio frequency (RF) antenna 62 and other suitable known components. As further shown in FIG. 1, a radio frequency (RF) emission source 67 on the one or more marine vessels 30 emits one or more RF emissions 66 comprising one or more of radio frequency (RF) signals 66a, marine radar signals 66b, marine radio frequency (RF) radio signals 66c, and/or another suitable RF emission, from the one or more marine vessels 30. The one or more RF emissions 66 (see FIG. 1) are emitted from the one or more marine vessels 30 (see FIG. 1) and are observed, geolocated, and received by the one or more RF receivers 60 (see FIG. 1), in order to detect one or more RF signatures 64 (see FIG. 1). The RF receiver 60 (see FIG. 3A) preferably comprises one or more known RF receivers, for example, those having a VHF (very high frequency) waveband range of RF electromagnetic waves from 30-300 MHz (MegaHertz) with corresponding wavelengths in a range of 10 meters to 1 meter; having a UHF (ultra high frequency) waveband range of RF electromagnetic waves from 300-3000 MHz (or 3 GHz (GigaHertz)) with corresponding wavelengths in a range of 1 meter to 10 decimeters; or having another suitable waveband range.

The one or more payloads 40 (see FIG. 1) may comprise the integrated AIS/RF receiver 80 (see FIG. 1) comprising one or more AIS receivers 52 (see FIG. 1) configured to observe, geolocate, and receive AIS emissions 58 (see FIG. 1) from the one or more marine vessels 30 (see FIG. 1) to detect AIS signatures 56 (see FIG. 1), and further comprising one or more RF receivers 60 (see FIG. 1) configured to receive RF emissions 66 (see FIG. 1) from the one or more marine vessels 30 (see FIG. 1) to detect RF signatures 64 (see FIG. 1).

Figure 4A:
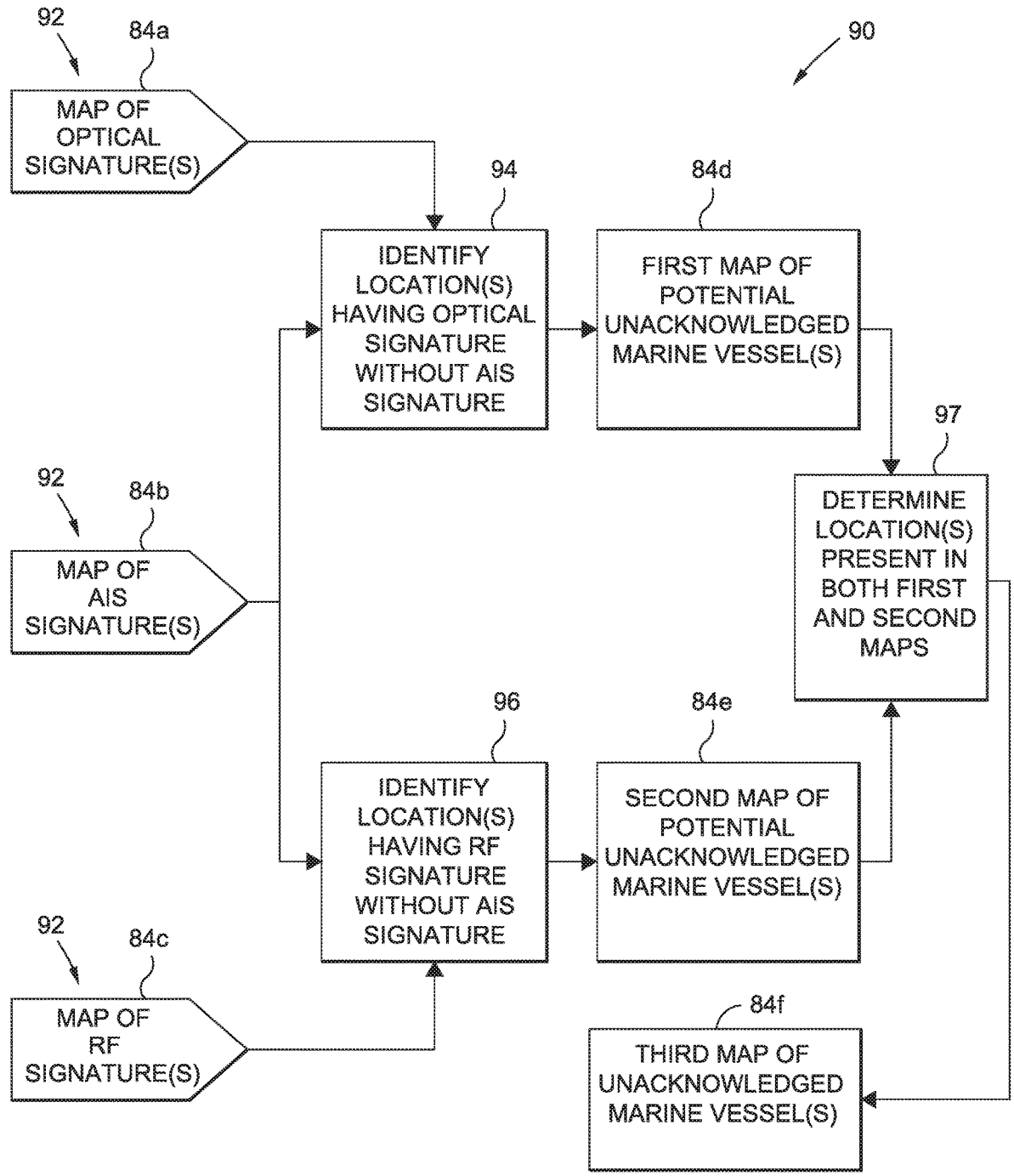
FIG. 4A is an illustration of a process flow diagram of an embodiment of an analysis process that may be used in an embodiment of a system and a method of the disclosure.
Figure 4B:
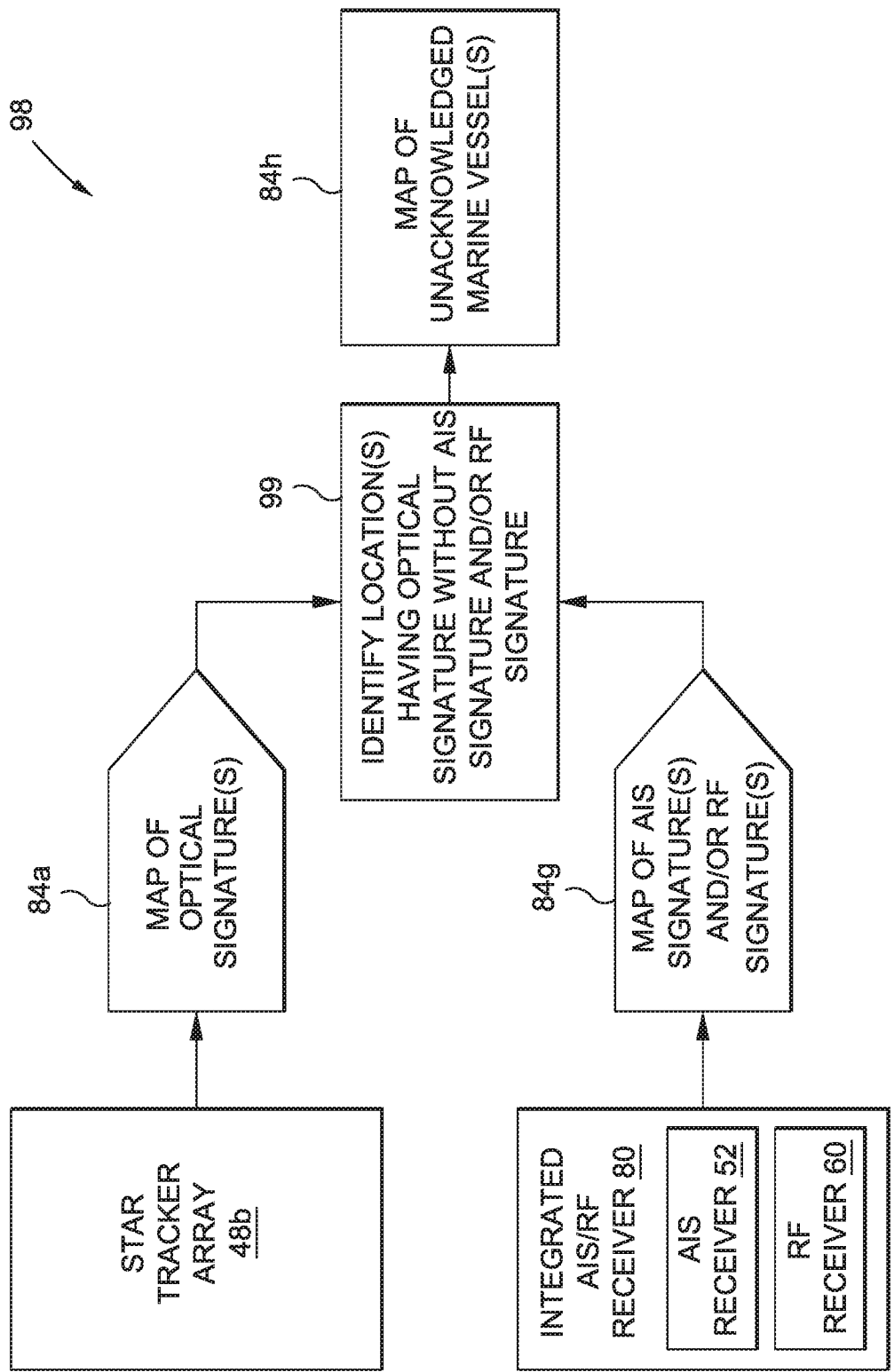
FIG. 4B is an illustration of a process flow diagram of an embodiment of an analysis process using an integrated AIS/RF receiver and a star tracker array that may be used in an embodiment of a system and a method of the disclosure.

In one embodiment, the one or more payloads 40 (see FIG. 1) may comprise the integrated AIS/RF receiver 80 (see FIGS. 1, 4B) positioned in a co-boresight alignment 82 (see FIG. 1) with a star tracker array 48b (see FIGS. 1, 4B). As used herein, "co-boresight alignment" means aligning the axis of symmetry (e.g., axis of symmetry of a parabola is a vertical line that divides the parabola into two congruent halves) of one receiver, such as the integrated AIS/RF receiver 80, with the axis of symmetry of another receiver, such as the optical receiver 44 comprising the star tracker array 48b, so that the receivers are in alignment and pointing and observing, geolocating, and receiving observable signatures 92 (see FIG. 4A) in the same direction toward earth and toward the one or more marine vessels 30 (see FIG. 1). The integrated AIS/RF receiver 80 (see FIGS. 1, 4B) comprises a combination of the AIS receiver 52 (see FIGS. 1, 4B) and the RF receiver 60 (see FIGS. 1, 4B). The integrated AIS/RF receiver 80 (see FIG. 1) and the star tracker array 48b (see FIG. 1) positioned in the co-boresight alignment 82 (see FIG. 1) and pointed at the earth, facilitate detection of optical signatures 46 (see FIG. 1) against the dark background 86b (see FIG. 2) of the water 86 (see FIG. 2), such as the ocean or sea.

The sensing system 12 (see FIG. 1) and system 10 (see FIG. 1) may comprise single or separate observation platforms 16 (see FIG. 1) and payloads 40 (see FIG. 1), where the payload 40 (see FIG. 1) may comprise a single optical receiver 44 (see FIG. 1), a single AIS receiver 52 (see FIG. 1), or a single RF receiver 60 (see FIG. 1), or may comprise a single unit integrated receiver, such as an integrated AIS/RF receiver 80 (see FIG. 1), or another suitable integrated receiver. Other integrated receivers may comprise, for example, an integration of the optical receiver 44 (see FIG. 1) and the AIS receiver 52 (see FIG. 1), or an integration of the optical receiver 44 (see FIG. 1) and the RF receiver 60 (see FIG. 1), or an integration of the optical receiver 44 (see FIG. 1), the AIS receiver 52 (see FIG. 1), and the RF receiver 60 (see FIG. 1).

In one exemplary embodiment, the sensing system 12 (see FIG. 1) and system 10 (see FIG. 1) may comprise one observation platform 16 (see FIG. 1) with one payload 40 (see FIG. 1) comprising the optical receiver 44 (see FIG. 1), the AIS receiver 52 (see FIG. 1), and the RF receiver 60 (see FIG. 1). In another exemplary embodiment, the sensing system 12 (see FIG. 1) and the system 10 (see FIG. 1) may comprise one observation platform 16 (see FIG. 1) with one payload 40 (see FIG. 1) comprising the optical receiver 44 (see FIG. 1) and the RF receiver 60 (see FIG. 1) and may comprise another observation platform 16 (see FIG. 1) with one payload 40 (see FIG. 1) comprising the AIS receiver 52 (see FIG. 1). In yet another exemplary embodiment, the sensing system 12 (see FIG. 1) and the system 10 (see FIG. 1) may comprise three separate observation platforms 16 (see FIG. 1), each with a separate payload 40 (see FIG. 1), where the first payload comprises the optical receiver 44 (see FIG. 1), the second payload 40 comprises the RF receiver 60 (see FIG. 1), and the third payload 40 comprises the AIS receiver 52 (see FIG. 1). Other suitable combinations of observation platforms 16 (see FIG. 1) and payloads 40 (see FIG. 1) with one or more receivers may also be used.

As shown in FIG. 1, the one or more payloads 40 preferably further comprise at least one processor 68, or one or more processors 68, such as in the form of a payload processor 68a, or one or more payload processors 68a, positioned on or in the payload 40 (see FIG. 1) of the sensing system 12 (see FIG. 1) and the system 10 (see FIG. 1). The at least one processor 68 (see FIGS. 1, 5A), such as in the form of a payload processor 68a (see FIGS. 1, 5A), may preferably have an analysis software 110 (see FIG. 5A) and/or other software programs installed on or programmed into the processor 68 (see FIGS. 1, 5A), such as the payload processor 68a (see FIGS. 1, 5A), which may be in the form of a computer 100 (see FIG. 5A).

The at least one processor 68 (see FIGS. 1, 5A), such as in the form of a payload processor 68a (see FIGS. 1, 5A), with the analysis software 110 (see FIG. 5A), is preferably configured to process and analyze the one or more optical signatures 46 (see FIG. 1), the one or more AIS signatures 56 (see FIG. 1), and the one or more RF signatures 64 (see FIG. 1), in order to identify and track one or more unacknowledged marine vessels 30b (see FIG. 1) from the one or more marine vessels 30 (see FIG. 1).

The at least one processor 68 (see FIGS. 1, 5A), such as in the form of payload processor 68a (see FIGS. 1, 5A), with the analysis software 110 (see FIG. 5A), may be configured to collect and process, or initially process, data 72 (see FIG. 1) received from the optical receiver 44 (see FIG. 1), the AIS receiver 52 (see FIG. 1), and/or the RF receiver 60 (see FIG. 1), including data 72 (see FIG. 1) for, or relating to, one or more optical signatures 46 (see FIG. 1), one or more AIS signatures 56 (see FIG. 1), and/one or more RF signatures 64 (see FIG. 1) of the one or more marine vessels 30 (see FIG. 1). The at least one processor 68 (see FIGS. 1, 5A), such as in the form of payload processor 68*a* (see FIGS. 1, 5A), with the analysis software 110 (see FIG. 5A), may be configured to identify one or more outliers 74 (see FIG. 1) in the data 72 (see FIG. 1), for example, where an RF emission 66 (see FIG. 1), such as an RF signal 66*a* (see FIG. 1), is present, when an AIS emission 58 (see FIG. 1), such as an AIS signal 58*b* (see FIG. 1), is not present, which enables and facilitates identification of potential unacknowledged marine vessels 30*c* (see FIG. 1).

The at least one processor 68 (see FIGS. 1, 5A), such as in the form of payload processor 68*a* (see FIGS. 1, 5A), with the analysis software 110 (see FIG. 5A), may be configured to reduce the data 72 (see FIG. 1) to a location dataset 76 (see FIG. 1) that identifies those marine vessels 30 (see FIG. 1) that are most likely unacknowledged marine vessels 30*b* (see FIG. 1). The at least one processor 68 (see FIGS. 1, 5A), such as in the form of payload processor 68*a* (see FIGS. 1, 5A), with the analysis software 110 (see FIG. 5A), may be configured to map the one or more marine vessels 30 (see FIG. 1) and correlate RF signatures 64 (see FIG. 1) to the optical signatures 46 (see FIG. 1) to identify optical emissions 50 (see FIG. 1) not corresponding to AIS emissions 58 or RF emissions 66 (see FIG. 1). This correlation identifies and determines one or more unacknowledged marine vessels 30*b* (see FIG. 1).

Preferably, the sensing system 10 (see FIG. 1) simultaneously observes the optical emissions 50 (see FIG. 1) and the RF emissions 66 (see FIG. 1) from the one or more marine vessels 30 (see FIG. 1) to identify when a marine vessel 30 (see FIG. 1) changes status from an acknowledged marine vessel 30*a* (see FIG. 1) to an unacknowledged marine vessel 30*b* (see FIG. 1). Preferably, the sensing system 10 (see FIG. 1) detects the optical signatures 46 (see FIG. 1), the AIS signatures 56 (see FIG. 1), and the RF signatures 64 (see FIG. 1) from the one or more marine vessels 30 (see FIG. 1), to identify and track one or more unacknowledged marine vessels 30*b* (see FIG. 1).

As shown in FIG. 1, the one or more payloads 40 may further comprise one or more transmitters 78. The one or more transmitters 78 (see FIG. 1) may transmit data 72 (see FIG. 1) from the payload 40 (see FIG. 1) of the sensing system 12 (see FIG. 1) to one or more separate data systems, for example, ones located at one or more earth-based stations 14 (see FIGS. 1, 2). In particular, the one or more transmitters 78 (see FIG. 1) may be configured to transmit payload data transmission 79 (see FIGS. 1, 2) for, or relating to, the one or more optical signatures 46 (see FIG. 1), the processed AIS signatures 56 (see FIG. 1), and the processed RF signatures 64 (see FIG. 1), from the one or more payloads 40 (see FIG. 1) to one or more earth-based receivers 70 (see FIG. 1) located at one or more earth-based stations 14 (see FIGS. 1, 2). The one or more payloads 40 may further comprise additional components such as one or more transponders, one or more transceivers, additional antennas, or other suitable known components.

In one embodiment, the system 10 (see FIG. 1) includes the sensing system 12 (see FIG. 1) and does not include one or more earth-based stations 14 (see FIG. 1) in communication with the sensing system 12 (see FIG. 1). For example, the sensing system 12 may comprise an aircraft 32 (see FIG. 1) with a payload 40 (see FIG. 1) having a receiver assembly 43 (see FIG. 1) comprising an optical receiver 44 (see FIG. 1), an AIS receiver 52 (see FIG. 1), and an RF receiver 60 (see FIG. 1), and having a payload processor 68*a* with analysis software 110 (see FIG. 5A), or other software programs, configured to perform one or more processes of receiving data, collecting data, processing data, initially processing data, storing data, or other suitable process, where the sensing system 12 (see FIG. 1) obtains the data 72 (see FIG. 1) while the aircraft 32 (see FIG. 1) is in the air 88 (see FIG. 2). Once the aircraft 32 is on the ground, the data 72 may be removed from the payload processor 68*a* (see FIG. 1) and further processed and analyzed with an earth-based processor 68*b* (see FIG. 1) with analysis software 110 (see FIG. 5A), or other software programs.

In another embodiment of the system 10 (see FIG. 1), the system 10 includes the sensing system 12 (see FIG. 1) and one or more earth-based stations 14 (see FIG. 1) in communication with the sensing system 12 (see FIG. 1). There is disclosed the system 10 (see FIG. 1) for identifying and tracking unacknowledged marine vessels 30*b* (see FIG. 1) via analysis of optical signatures 46 (see FIG. 1), automatic identification system (AIS) signatures 56 (see FIG. 1), and radio frequency (RF) signatures 64 (see FIG. 1).

As shown in FIG. 1, and discussed above, the system 10 comprises the sensing system 12. As further shown in FIG. 1, the sensing system 12 comprises one or more observation platforms 16 positioned remotely above one or more marine vessels 30 on water 86. The one or more observation platforms 16 (see FIG. 1) each have a navigation system 20 (see FIG. 1). The one or more observation platforms 16 (see FIG. 1) comprise one or more spaceborne observation platforms 22 (see FIG. 1), one or more airborne observation platforms 24 (see FIG. 1), or a combination thereof.

As discussed above, the sensing system 12 (see FIG. 1) comprises one or more payloads 40 (see FIG. 1) coupled to the one or more observation platforms 16 (see FIG. 1). The one or more payloads 40 (see FIG. 1) comprise one or more optical receivers 44 (see FIG. 1) comprising a star tracker 48*a* (see FIG. 1) or a star tracker array 48*b* (see FIG. 1), or another suitable optical receiver 44 (see FIG. 1). Each optical receiver 44 (see FIG. 1) is configured to observe, geolocate, and receive one or more optical emissions 50 (see FIG. 1) from the one or more marine vessels 30 (see FIG. 1) to detect one or more optical signatures 46 (see FIG. 1). The one or more optical emissions 50 (see FIG. 1) comprise one or more of visible lights 50*a* (see FIG. 1), cabin lights 50*b* (see FIG. 1), and running lights 50*c* (see FIG. 1), on the one or more marine vessels 30 (see FIG. 1).

The one or more payloads 40 (see FIG. 1) further comprise the integrated AIS/RF receiver 80 (see FIG. 1) comprising one or more AIS receivers 52 (see FIG. 1) configured to observe, geolocate, and receive AIS emissions 58 (see FIG. 1) from the one or more marine vessels 30 (see FIG. 1) to detect AIS signatures 56 (see FIG. 1), and further comprising one or more RF receivers 60 (see FIG. 1) configured to receive RF emissions 66 (see FIG. 1) from the one or more marine vessels 30 (see FIG. 1) to detect RF signatures 64 (see FIG. 1). The AIS emissions 58 (see FIG. 1) comprise one or more of an automatic identification system (AIS) signal beacon 58*a* (see FIG. 1) and automatic identification system (AIS) signals 58*b* (see FIG. 1), from the one or more marine vessels 30 (see FIG. 1). The RF emissions 66 (see FIG. 1) comprise one or more of radio frequency RF signals 66*a* (see FIG. 1), marine radar signals 66*b* (see FIG. 1), and marine radio frequency (RF) radio signals 66*c* (see FIG. 1), from the one or more marine vessels 30 (see FIG. 1). In one embodiment, the one or more payloads 40 (see FIG. 1) may comprise the integrated AIS/RF receiver 80 (see FIG. 1) positioned in a co-boresight alignment 82 (see FIG. 1) with an optical receiver 44 (see FIG. 1), such as a star tracker 48*a* (see FIG. 1) or a star tracker array 48*b* (see FIG. 1).

As shown in FIG. 1, the one or more payloads 40 further comprise one or more transmitters 78 configured to transmit payload data transmission 79 for, or relating to, the one or more optical signatures 46, the one or more AIS signatures 56, and the one or more RF signatures 64, from the one or more payloads 40 of the sensing system 12.

In this embodiment, as shown in FIG. 1, the system 10 further comprises the one or more earth-based stations 14 having one or more earth-based receivers 70 configured to receive the payload data transmission 79 from the one or more payloads 40 of the sensing system 12.

The system 10 (see FIG. 1) further comprises one or more processors 68 (see FIG. 1), such as one or more computers 100 (see FIGS. 5A-5B), with an analysis software 110 (see FIGS. 5A-5B), configured to process and analyze the one or more optical signatures 46 (see FIG. 1), the one or more AIS signatures 56 (see FIG. 1), and the one or more RF signatures 64 (see FIG. 1), to identify and track one or more unacknowledged marine vessels 30b (see FIG. 1) from the one or more marine vessels 30 (see FIG. 1). The plurality of processors 68 (see FIG. 1), such as the plurality of computers 100 (see FIGS. 5A-5B), may be located on the one or more payloads 40 (see FIG. 1), may be located at the one or more earth-based stations 14 (see FIG. 1), or may be located both on the one or more payloads 40 (see FIG. 1) and at the one or more earth-based stations 14 (see FIG. 1).

The one or more processors 68 (see FIGS. 1, 5A) may comprise one or more payload processors 68a (see FIGS. 1, 5A) comprising one or more computers 100 (see FIG. 5A) positioned on or in the one or more payloads 40 (see FIG. 1). The one or more processors 68 (see FIGS. 1, 5B) may further comprise one or more earth-based processors 68b (see FIGS. 1, 5B) positioned on or in the one or more of the earth-based stations 14 (see FIGS. 1, 2). The one or more earth-based stations 14 (see FIGS. 1, 2) may comprise one or more earth-based receivers 70 (see FIGS. 1, 2) coupled to the one or more processors 68 (see FIGS. 1, 5B) comprising the one or more earth-based processors 68b (see FIGS. 1, 5B), such as in the form of one or more computers 100 (see FIG. 5B) with analysis software 110 (see FIG. 5B), configured to process, further process, and/or analyze the data 72 (see FIG. 1) for, or relating to, the transmitted optical signatures 46 (see FIG. 1), the transmitted AIS signatures 56 (see FIG. 1), and the transmitted RF signatures 64 (see FIG. 1).

The one or more processors 68 (see FIGS. 1, 5A), such as in the form of earth-based processor 68b (see FIGS. 1, 5B), with the analysis software 110 (see FIG. 5B), may be configured to collect and process, or initially process, data 72 (see FIG. 1), such as payload data transmission 79 (see FIG. 1) received from the one or more payloads 40 (see FIG. 1) for, or relating to, the optical signatures 46 (see FIG. 1), AIS signatures 56 (see FIG. 1), and RF signatures 64 (see FIG. 1) of the one or more marine vessels 30 (see FIG. 1). The one or more processors 68 (see FIGS. 1, 5B), such as in the form of earth-based processor 68b (see FIGS. 1, 5B), with the analysis software 110 (see FIG. 5B), may be configured to identify one or more outliers 74 (see FIG. 1) in the data 72 (see FIG. 1), which enables and facilitates identification of potential unacknowledged marine vessels 30c (see FIG. 1).

The one or more processors 68 (see FIGS. 1, 5B), such as in the form of earth-based processor 68b (see FIGS. 1, 5B), with the analysis software 110 (see FIG. 5B), may be configured to reduce the data 72 (see FIG. 1) to a location dataset 76 (see FIG. 1) that identifies those marine vessels 30 (see FIG. 1) that are most likely unacknowledged marine vessels 30b (see FIG. 1). The one or more processors 68 (see FIGS. 1, 5B), such as in the form of earth-based processor 68b (see FIGS. 1, 5B), with the analysis software 110 (see FIG. 5B), may be configured to map the one or more marine vessels 30 (see FIG. 1) and correlate RF signatures 64 (see FIG. 1) to the optical signatures 46 (see FIG. 1) to identify optical emissions 50 (see FIG. 1) not corresponding to AIS emissions 58 (see FIG. 1) or RF emissions 66 (see FIG. 1). This correlation identifies and determines one or more unacknowledged marine vessels 30b (see FIG. 1).

The one or more earth-based stations 14 (see FIGS. 1, 2), or terrestrial locations or stations, may be located throughout the world. The one or more earth-based stations 14 (see FIG. 1) preferably implement a communications network to access the sensing system 12 (see FIG. 1) of the system 10 (see FIG. 1) and to provide an interface with other data networks. The one or more earth-based stations 14 (see FIG. 1) may comprise freestanding stations, control centers, network control centers, one or more radomes, for example, including enclosed tracking antennas, controllers, processors, transceivers, and radio equipment, or other suitable earth-based stations 14 (see FIG. 1).

Figure 2:
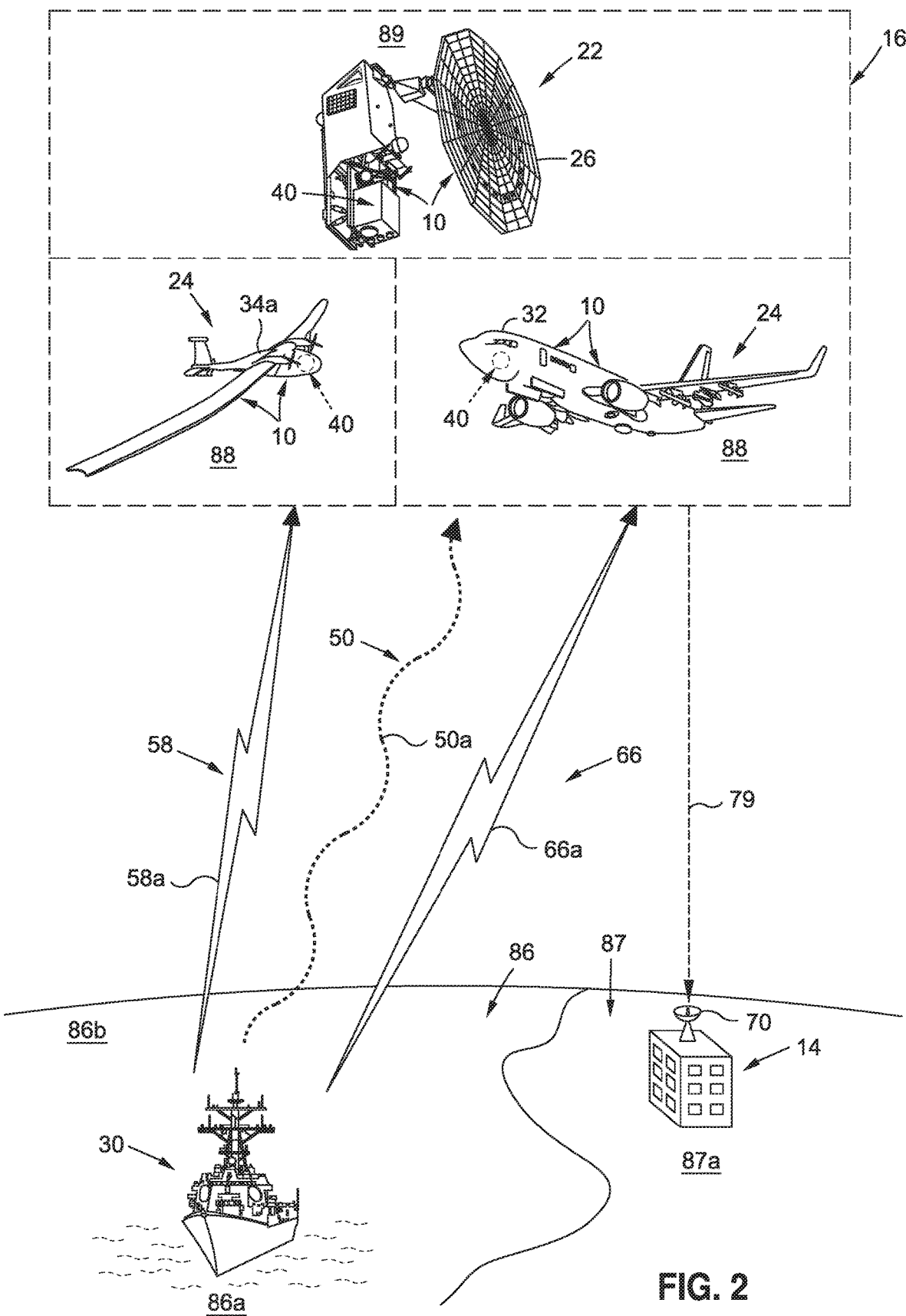
FIG. 2 is an illustration of an environmental perspective view of exemplary observation platforms with payloads that may be used in embodiments of a system and a method of the disclosure, and shows the exemplary observation platforms with payloads above a marine vessel and an earth-based station.

Now referring to FIG. 2, FIG. 2 is an illustration of an environmental perspective view of exemplary observation platforms 16 with payloads 40 that may be used in embodiments of the system 10, the sensing system 12 (see FIG. 1), and the method 150 (see FIG. 6) of the disclosure, and shows the exemplary observation platforms 16 with payloads 40 above a marine vessel 30 on water 86, and in communication with an earth-based station 14 on land 87. As shown in FIG. 2, the one or more observation platforms 16 may include one or more of a spaceborne observation platform 22, such as in the form of a satellite 26, positioned in space 89. As further shown in FIG. 2, the one or more observation platforms 16 may include one or more of an airborne observation platform 24, such as in the form of an aircraft 32 positioned in air 88, or a high altitude unmanned air vehicle (UAV) 34a, positioned in air 88. As shown in FIG. 2, the system 10 may comprise the spaceborne observation platform 22 with the payload 40, and/or may comprise one or more airborne observation platform 24 with the payload 40.

As further shown in FIG. 2, the marine vessel 30 is on the water 86 and positioned at a water-based location 86a. For purposes of observation and detection of optical signatures 46 (see FIG. 1) by the one or more optical receivers 44 (see FIG. 1), such as star trackers 48a (see FIG. 1), on the one or more observation platforms 16 (see FIGS. 1, 2), the water 86 provides a dark background 86b (see FIG. 2) for detection of the optical signatures 46 (see FIG. 1). FIG. 2 shows the systems 10 with the payloads 40 receiving an optical emission 50, such as in the form of one or more visible lights 50a, emitted from the marine vessel 30, and receiving an AIS emission 58, such as in the form of an AIS signal beacon 58a, emitted from the marine vessel 30, and receiving an RF emission source 66, such as in the form of an RF signal 66a, emitted from the marine vessel 30.

FIG. 2 further shows the earth-based station 14 located on land 87 at a land-based location 87a. The earth-based station 14 (see FIG. 2) has an earth-based receiver 70 (see FIG. 2) configured to receive payload data transmission 79 (see FIG. 2) for, or relating to, the optical signatures 46 (see FIG. 1), the AIS signatures 56 (see FIG. 1), and the RF signatures 64 (see FIG. 1), from one or more payloads 40 (see FIG. 2) of the system 10 (see FIG. 2). The payload data transmission 79 (see FIG. 2) may be transmitted from one or more transmitters 78 (see FIG. 1) of the one or more payloads 40 (see FIGS. 1, 2) of the system 10 (see FIGS. 1, 2) and the sensing system 12 (see FIG. 1). The earth-based station 14 (see FIGS. 1, 2) may include one or more earth-based processors 68*b* (see FIGS. 1, 5B), such as one or more computers 100 (see FIG. 5B), having, or programmed with, an analysis software 110 (see FIG. 5B) configured to process and analyze the optical signatures 46 (see FIG. 1), the AIS signatures 56 (see FIG. 1), and the RF signatures 64 (see FIG. 1), in order to identify and track one or more unacknowledged marine vessels 30*b* (see FIG. 1) from the one or more marine vessels 30 (see FIGS. 1, 2).

Figure 3A:
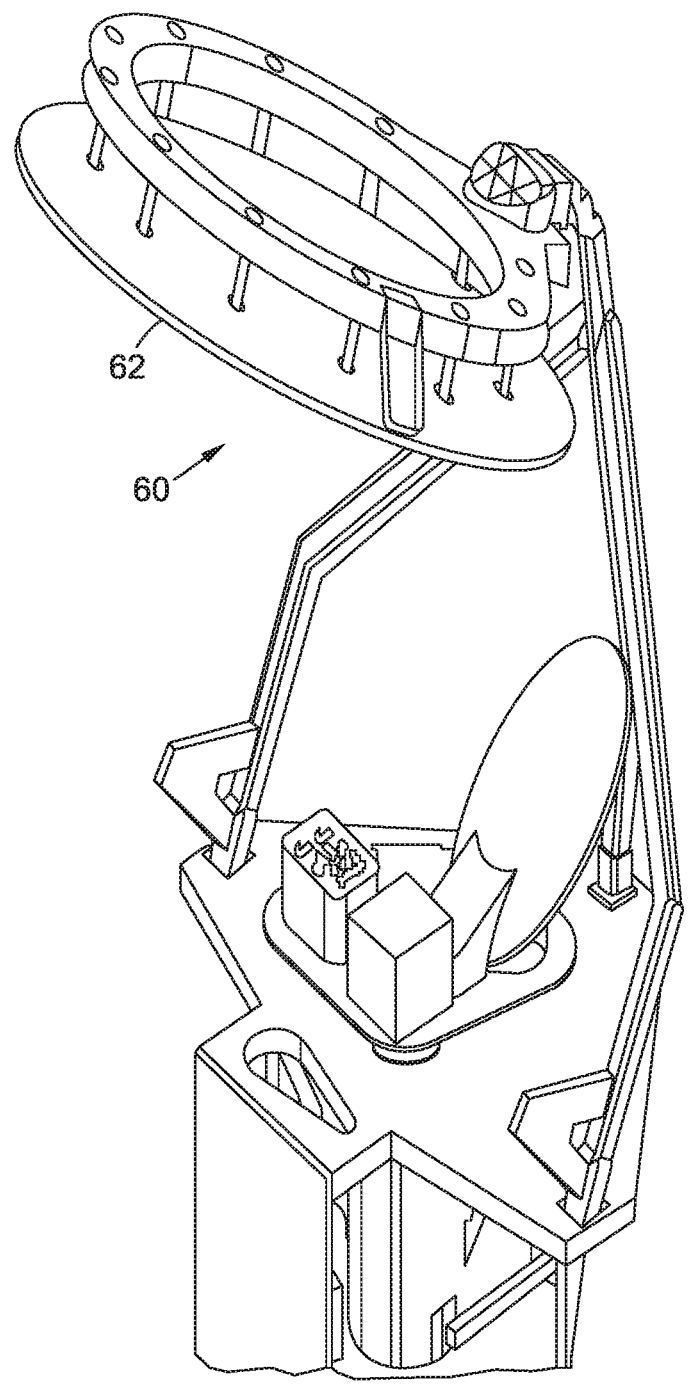
FIG. 3A is an illustration of a perspective view of an exemplary radio frequency (RF) receiver that may be used in embodiments of a system and a method of the disclosure.

Now referring to FIG. 3A, FIG. 3A is an illustration of a perspective view of an exemplary radio frequency (RF) receiver 60 that may be used in embodiments of the system 10 (see FIG. 1), the sensing system 12 (see FIG. 1), and the method 150 (see FIG. 1) of the disclosure. As shown in FIG. 3A, the RF receiver 60 includes an RF antenna 62. The RF receiver 60 (see FIG. 3A) preferably comprises one or more known RF receivers, for example, those having a VHF (very high frequency) waveband range of RF electromagnetic waves from 30-300 MHz (MegaHertz) with corresponding wavelengths in a range of 10 meters to 1 meter; having a UHF (ultra high frequency) waveband range of RF electromagnetic waves from 300-3000 MHz (or 3 GHz (GigaHertz)) with corresponding wavelengths in a range of 1 meter to 10 decimeters; or having another suitable waveband range.

Figure 3B:
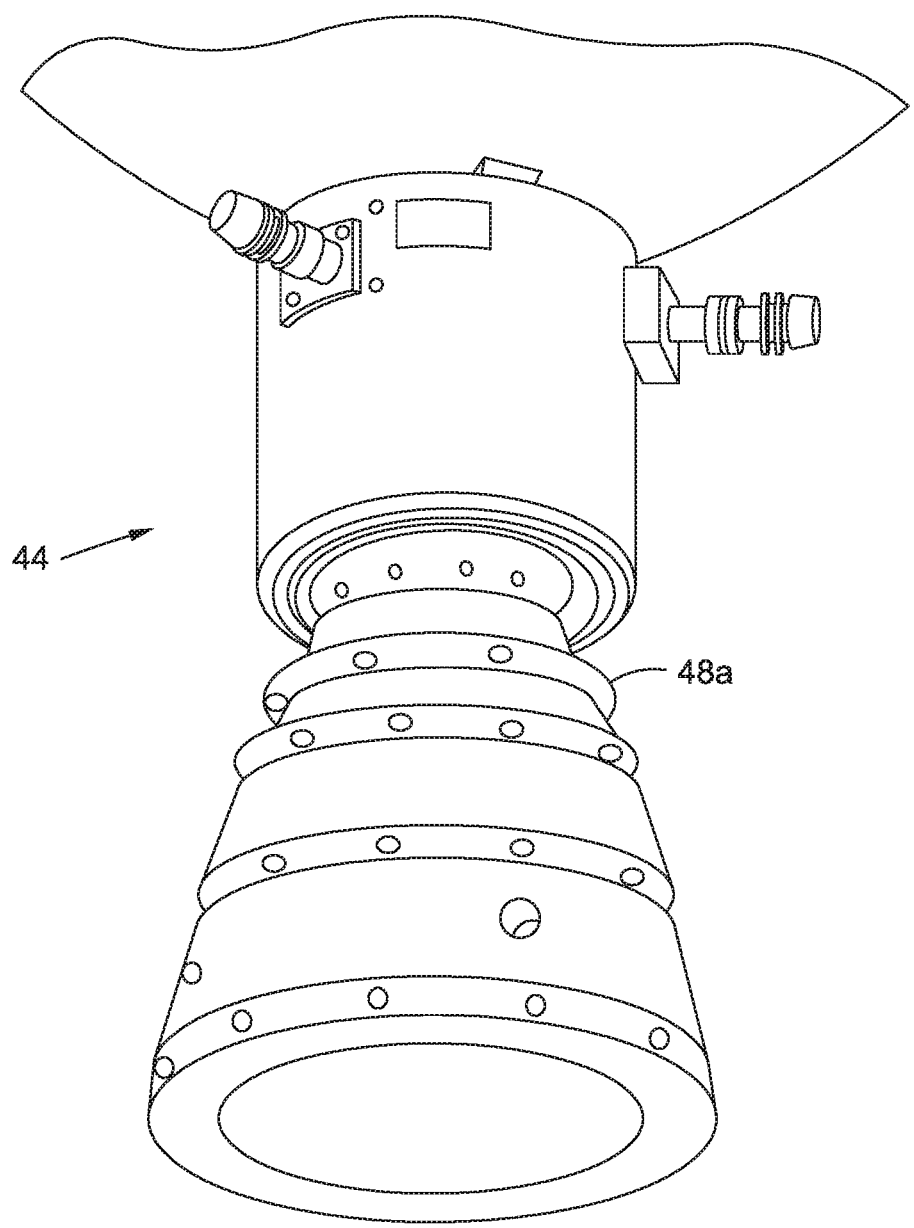
FIG. 3B is an illustration of a perspective view of an exemplary optical receiver in the form of a star tracker that may be used in embodiments of a system and a method of the disclosure.

Now referring to FIG. 3B, FIG. 3B is an illustration of a perspective view of an exemplary optical receiver 44, in the form of a star tracker 48*a*, that may be used in embodiments of the system 10 (see FIG. 1), the sensing system 12 (see FIG. 1), and the method 150 (see FIG. 6) of the disclosure. Star trackers 48*a* (see FIG. 3A) are known optical devices that use photocells or a camera measure the positions of objects. An example of a star tracker includes a charge-coupled device (CCD) based star tracker, which is preferably small in size and lightweight.

A star tracker or star camera is typically used as a celestial reference device that recognizes star patterns, such as constellations. However, in the disclosed sensing system 12 (see FIG. 1), system 10 (see FIG. 1), and method 150 (see FIG. 6), the star tracker 48*a* (see FIGS. 1, 3B) and star tracker array 48*b* (see FIG. 1) are used in a new or novel way by directing or pointing the star tracker 48*a* (see FIGS. 1, 3B) or the star tracker array 48*b* (see FIG. 1) toward the earth, and in particular, toward one or more marine vessels 30 (see FIGS. 1, 2) on the water 86 (see FIG. 2), such as traveling on the ocean or sea, to observe, geolocate, and receive one or more optical emissions 50 (see FIG. 1) from the one or more marine vessels 30 (see FIGS. 1, 2), in order to detect one or more optical signatures 46 (see FIG. 1). Thus, as used in the sensing system 12 (see FIG. 1), the system 10 (see FIG. 1), and method 150 (see FIG. 6) disclosed herein, the star tracker 48*a* (see FIGS. 1, 3B) or star tracker array 48*b* (see FIG. 1) is used as an optical receiver, having at least one imaging device or camera, coupled to a payload 40 (see FIG. 1) on an observation platform 16 (see FIG. 1) that is positioned remotely in the air 88 (see FIG. 2) or in space 89 (see FIG. 2), above one or more marine vessels 30 (see FIG. 1). When the star tracker 48*a* (see FIGS. 1, 3B) or star tracker array 48*b* (see FIG. 1) is in use in the disclosed sensing system 12 (see FIG. 1), system 10 (see FIG. 1), and method 150 (see FIG. 6), it is directed or pointed toward the earth, and in particular, toward one or more marine vessels 30 on the water 86 (see FIG. 2), to observe, geolocate, and receive one or more optical emissions 50 (see FIGS. 1, 2), comprising one or more of visible lights 50*a* (see FIGS. 1, 2), cabin lights 50*b* (see FIG. 1), running lights 50*c* (see FIG. 1), or another suitable optical emission 50 (see FIG. 1), on the one or more marine vessels 30 (see FIG. 1), in order to detect one or more optical signatures 46 (see FIG. 1).

Referring now to FIG. 4A, FIG. 4A is an illustration of a process flow diagram of an embodiment of an analysis process 90 that may be used in embodiments of the system 10 (see FIG. 1), the sensing system 12 (see FIG. 1), and the method 150 (see FIG. 6) of the disclosure. The analysis process 90 (see FIG. 4A) uses a processor 68 (see FIGS. 1, 5A-5B), such as a computer 100 (see FIGS. 5A-5B) with an analysis software 110 (see FIGS. 5A-5B) to develop maps 84 (see FIG. 1) of observable signatures 92 (see FIG. 4A). The observable signatures 92 (see FIG. 4A) observed and received by the one or more optical receivers 44 (see FIG. 1) are used to develop a map 84*a* (see FIG. 4A) of one or more optical signatures 46 (see FIG. 1). The observable signatures 92 (see FIG. 4A) observed and received by the one or more AIS receivers 52 (see FIG. 1) are used to develop a map 84*b* (see FIG. 4A) of one or more AIS signatures 56 (see FIG. 1). The observable signatures 92 (see FIG. 4A) observed and received by the one or more RF receivers 60 (see FIG. 1) are used to develop a map 84*c* (see FIG. 4A) of one or more RF signatures 64 (see FIG. 1).

As shown in FIG. 4A, the analysis process 90 includes step 94 of identifying one or more locations 38 (see FIG. 1) having the optical signature 46 (see FIG. 1) without the AIS signature 56 (see FIG. 1), and the location dataset 76 (see FIG. 1) identified is used to develop a first map 84*d* of potential unacknowledged marine vessels 30*c* (see FIG. 4A).

As shown in FIG. 4A, the analysis process 90 further includes step 96 of identifying one or more locations 38 (see FIG. 1) having the RF signature 64 (see FIG. 1) without the AIS signature 56 (see FIG. 1), and the location dataset 76 (see FIG. 1) identified is used to develop a second map 84*e* of potential unacknowledged marine vessels 30*c* (see FIG. 1).

As shown in FIG. 4A, the analysis process 90 further includes step 97 of determining one or more locations 38 (see FIG. 1) present on both the first map 84*d* and the second map 84*e*, and using the location dataset 76 (see FIG. 1) that is determined to develop a third map 84*f* identifying the one or more unacknowledged marine vessels 30*b* (see FIG. 1). Determining the location dataset 76 (see FIG. 1) for the third map 84*f* (see FIG. 4A) may comprise comparing, correlating, and/or summing, with the processor 68 (see FIG. 1, FIGS. 5A-5B), such as the computer 100 (see FIGS. 5A-5B), having analysis software 110 (see FIGS. 5A-5B), the one or more locations 38 (see FIG. 1) having the optical signature 46 (see FIG. 1) without the AIS signature 56 (see FIG. 1), and the one or more locations 38 (see FIG. 1) having the RF signature 64 (see FIG. 1) without the AIS signature 56 (see FIG. 1), to eliminate any false positives. The third map 84*f* (see FIG. 4A) is comprised of another location dataset 76 (see FIG. 1) of one or more locations 38 (see FIG. 1) of the one or more marine vessels 30 (see FIG. 1), where both the optical signature 46 (see FIG. 1) without the AIS signature 56 (see FIG. 1), and the RF signature 64 (see FIG. 1) without the AIS signature 56 (see FIG. 1), are detected.

Referring now to FIG. 4B, FIG. 4B is an illustration of a process flow diagram of an embodiment of an analysis process 98 using an integrated AIS/RF receiver 80 and a star tracker array 48*b* that may be used in embodiments of the system 10 (see FIG. 1), the sensing system 12 (see FIG. 1), and the method 150 (see FIG. 6) of the disclosure. As shown in FIG. 4B, when the star tracker array 48*b* and the integrated AIS/RF receiver 80 are positioned in a co-boresight alignment 82 (see FIG. 1) and are pointed at the earth, the optical signatures 46 (see FIG. 1) may be detected against the dark background 86*b* (see FIG. 2) of the water 86 (see FIG. 2), such as the ocean or sea or another body of water. The star tracker array 48*b* (see FIG. 4B) develops a map 84*a* (see FIG. 4B) of all the optical signatures 46 (see FIG. 1) from optical emissions 50 (see FIG. 1), such as visible lights 50*a* (see FIG. 1), cabin lights 50*b* (see FIG. 1), running lights 50*c* (see FIG. 1), or other suitable optical emissions 50 (see FIG. 1), of the one or more marine vessels 30 (see FIG. 1) on the water 86 (see FIG. 2).

As shown in FIG. 4B, the integrated AIS/RF receiver 80 develops a map 84*g* of AIS signatures 56 (see FIG. 1) and/or RF signatures 64 (see FIG. 1). The map 84*a* (see FIG. 4B) of optical signatures 46 (see FIG. 1) is then compared against the map 84*g* (see FIG. 4B) of AIS signatures 56 (see FIG. 1) and/or RF signatures 64 (see FIG. 1), and the process step 99 (see FIG. 4B) of identifying one or more locations 38 (see FIG. 1) having optical signatures 46 (see FIG. 1) without AIS signatures 56 (see FIG. 1) and/or without RF signatures 64 (see FIG. 1) is performed with the computer 100 (see FIGS. 5A-5B) and the analysis software 110 (see FIGS. 5A-5B) to identify marine vessels 30 (see FIG. 1) that are not transmitting from the AIS signals 58*b* (see FIG. 1) and/or the RF signals 66*a* (see FIG. 1) or RF marine radar signals 66*b* (see FIG. 1). This will be an indication of an unacknowledged marine vessel 30*b* (see FIG. 1). FIG. 4B shows a map 84*h* of unacknowledged marine vessels 30*b* that is developed or generated.

The integrated AIS/RF receiver 80 (see FIGS. 1, 4B) observes, geolocates, and receives both the AIS emissions 58 (see FIG. 1) and the RF emissions 66 (see FIG. 1), and correlates the AIS emissions 58 (see FIG. 1) and the RF emissions 66 (see FIG. 1) received by both the AIS receiver 52 (see FIG. 4B) and the RF receiver 60 (see FIG. 4B). This correlation preferably identifies one or more unacknowledged marine vessels 30*b* (see FIG. 1).

Figure 5A:
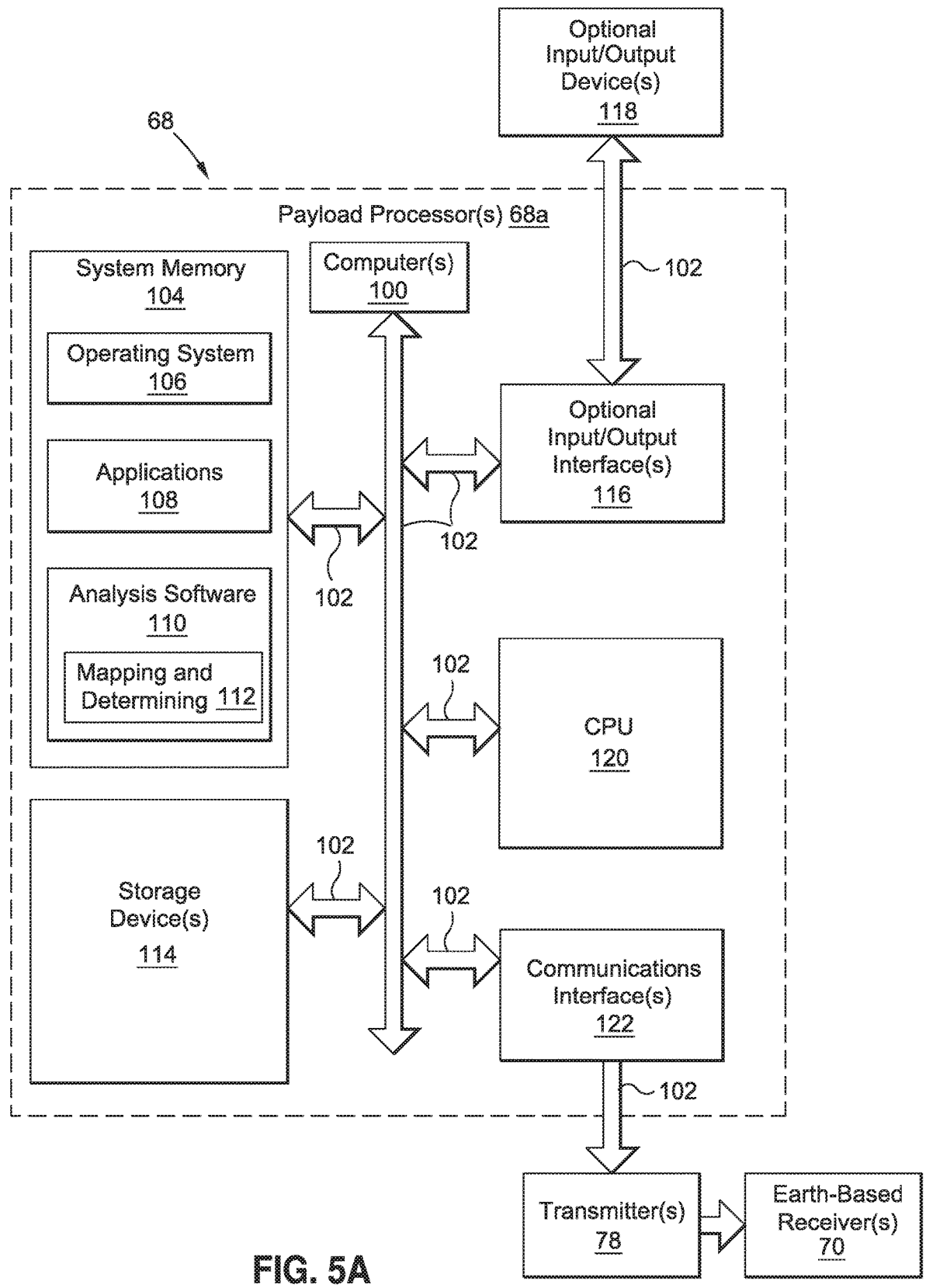
FIG. 5A is an illustration of a block diagram of a payload processor that may be used in embodiments of a system and a method of the disclosure.
Figure 5B:
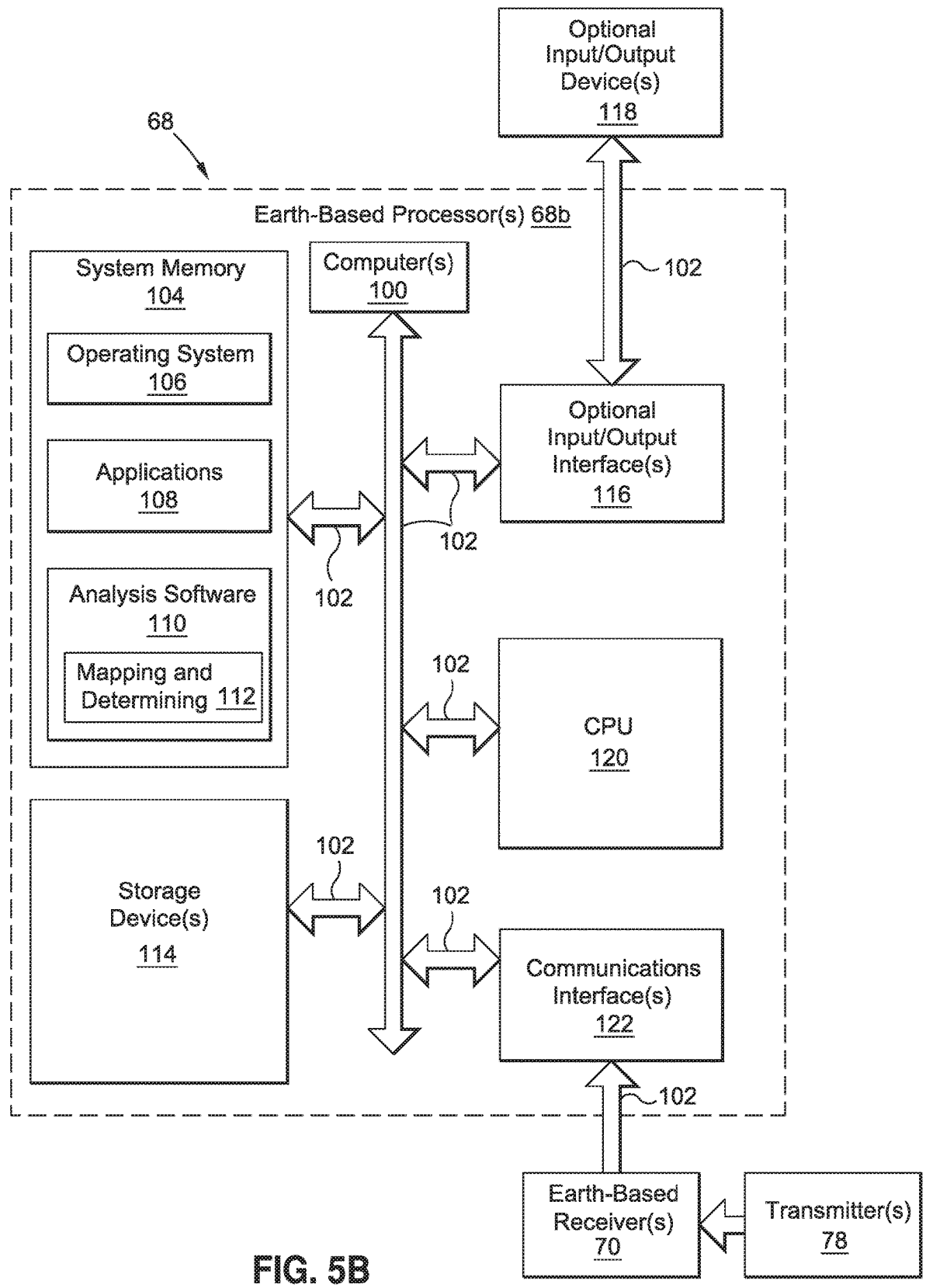
FIG. 5B is an illustration of a block diagram of an earth-based processor that may be used in embodiments of a system and a method of the disclosure.

Referring now to FIGS. 5A-5B, FIG. 5A is an illustration of a block diagram of a processor 68, such as in the form of a payload processor 68*a*, that may be used in embodiments of the system 10 (see FIG. 1), the sensing system 12 (see FIG. 1), and the method 150 (see FIG. 6) of the disclosure, and FIG. 5B is an illustration of a block diagram of a processor 68, such as in the form of an earth-based processor 68*b*, that may be used in embodiments of the system 10 (see FIG. 1), the sensing system 12 (see FIG. 1), and the method 150 (see FIG. 6) of the disclosure. The system 10 (see FIG. 1), the sensing system 12 (see FIG. 1), and the method 150 (see FIG. 6) are all computer implemented.

As shown in FIGS. 5A-5B, the one or more payload processors 68*a* (see FIG. 5A) and the one or more earth-based processors 68*b* (see FIG. 5B) may each comprise one or more computer(s) 100, or at least one computer 100, connected via one or more communications connections 102, to a system memory 104, to one or more storage devices 114, to one or more optional input/output interfaces 116, to a CPU (central processing unit) 120, and to one or more communications interfaces 122.

The one or more one or more communications connections 102 (see FIGS. 5A-5B) are preferably configured to provide communications or transfer data via wired connections, wireless connections, or another suitable connection between components within the processor 68 (see FIGS. 5A-5B), such as the computer 100 (see FIGS. 5A-5B) and/or connected to the processor 68 (see FIGS. 5A-5B), such as the computer 100 (see FIGS. 5A-5B). The one or more communications connections 102 (see FIGS. 5A-5B) may be in the form of a bus or data bus, or other suitable communications systems or frameworks that provide communications or transfer data between components within and/or connected to the processor 68 (see FIGS. 5A-5B), such as the computer 100 (see FIGS. 5A-5B).

As shown in FIGS. 5A-5B, the system memory 104 may comprise an operating system 106, a plurality of applications 108, and one or more software programs, such as analysis software 110, for example, for mapping and determining 112, such as mapping and determining one or more locations 38 (see FIG. 1) of observable signatures 92 (see FIG. 4A). The system memory 104 (see FIGS. 5A-5B) may comprise one or more of a random access memory (RAM), including dynamic and/or static RAM, on-chip or off-chip cache memory, or other suitable system or computer memory 104 (see FIGS. 5A-5B).

The one or more storage device(s) 114 (see FIGS. 5A-5B) may be used for storing the data 72 (see FIG. 1) in the one or more payload processor(s) 68*a* (see FIG. 5A) and/or storing the data 72 (see FIG. 1) in the one or more earth-based processor(s) 68*b* (see FIG. 5B). Instructions for the operating system 106 (see FIGS. 5A-5B), applications 108 (see FIGS. 5A-5B), and/or analysis software 110 (see FIGS. 5A-5B) or other software programs, may also be located in the storage device(s) 114 (see FIGS. 5A-5B). The one or more storage device(s) 114 (see FIGS. 5A-5B) may comprise one or more of a flash memory, a hard drive, Read-Only Memory (ROM), magnetic storage devices such as hard disks, floppy disk drives, and rewritable magnetic tape, rewritable optical disk drives and/or media, non-volatile random access memory (NVRAM), or other suitable persistent storage devices 114 (see FIGS. 5A-5B). The media used for the storage devices 114 (see FIGS. 5A-5B) may also be removable, such as, for example, a removable hard drive.

As further shown in FIGS. 5A-5B, the optional input/output interfaces(s) 116 interface with corresponding optional input/output device(s) 118 and may be connected via one or more communications connections 102. The one or more payload processors 68*a* (see FIG. 5A) and the one or more earth-based processors 68*b* (see FIG. 5B), such as in the form of one or more computer(s) 100 (see FIGS. 5A-5B), may be connected to the input/output interfaces(s) 116 (see FIGS. 5A-5B) via one or more communications connections 102 (see FIGS. 5A-5B). The one or more input/output interfaces(s) 116 (see FIGS. 5A-5B) may comprise displays, display devices, or other devices to display information or data.

The one or more input/output device(s) 118 (see FIGS. 5A-5B) may provide for the input and output of data 72 (see FIG. 1) with other devices connected to the processor(s) 68 (see FIGS. 5A-5B). The one or more input/output devices(s) 118 (see FIGS. 5A-5B) may comprise such devices as a keyboard, a mouse, a joystick, or other suitable input/output devices 118 (see FIGS. 5A-5B). For example, the one or more input/output device(s) 118 (see FIGS. 5A-5B) may provide a connection though a keyboard and mouse, or may send output to a printer or other device.

The CPU (central processing unit) 120 (see FIGS. 5A-5B) preferably serves to execute or perform computer implemented instructions, which may be located in the system memory 104 (see FIGS. 5A-5B), for the analysis software 110 (see FIGS. 5A-5B) and/or other software programs that may be loaded or programmed into the computer 100 (see FIGS. 5A-5B). These instructions may be referred to as system logic. The system logic may comprise an algorithm, program code, computer usable program code, computer readable program code, computer software (e.g., analysis software 110 (see FIGS. 5A-5B), or other suitable system logic that may be read and executed by the CPU 120 (see FIGS. 5A-5B). The system logic may be embodied on different physical or computer readable media, such as computer readable storage media, computer readable signal media, or other suitable computer readable media, and stored in the system memory 104 (see FIGS. 5A-5B), or in the one or more storage devices 114 (see FIGS. 5A-5B). The CPU 120 (see FIGS. 5A-5B) may comprise a number of CPU processors, a multi-processor core, or some other type of processor, depending on the particular implementation. As shown in FIGS. 5A-5B, the one or more computers 100 may be in communication with or connected to the CPU 120 (see FIGS. 5A-5B) via one or more communications connections 102.

The one or more communications interface(s) 122 (see FIGS. 5A-5B) may interface with other separate processors or computers. The one or more communications interfaces 122 (see FIGS. 5A-5B) may be configured to provide for communications links in accordance with any of a number of wired or wireless links or communications standards. The one or more communications interfaces 122 (see FIGS. 5A-5B) may comprise network links between various computers 100 (see FIGS. 5A-5B) and devices connected together within a network data processing system via wire connections, wireless communication links, fiber optic cables, or other suitable network connections, and that may connect to a network, a server, the Internet, or another system or device.

As shown in FIGS. 5A-5B, the one or more computers 100 may be in communication with or connected to the one or more communications interface(s) 122 via one or more communications connections 102. In FIG. 5A, with the payload processor 68a, the communications interface 122 is shown in communication with or connected to the transmitter 78, and communicates data 72 (see FIG. 1) or information, such as payload data transmission 79 (see FIGS. 1, 2), from the payload processor 68a to the transmitter 78. The transmitter 78 (see FIG. 5A) then transmits or communicates the data 72 (see FIG. 1) or information, such as the payload data transmission 79 (see FIGS. 1, 2), to the one or more earth-based receivers 70 (see FIG. 5A) coupled to the one or more earth-based processors 68b (see FIGS. 1, 5B) located in or at the one or more earth-based stations 14 (see FIGS. 1, 2). In FIG. 5B, with the earth-based processor 68b, the communications interface 122 is shown in communication with or connected to the earth-based receiver 70 located at the one or more earth-based stations 14 (see FIGS. 1, 2). The communications interface 122 (see FIG. 5B) receives the data 72 (see FIG. 1) or information, such as the payload data transmission 79 (see FIGS. 1, 2), transmitted or communicated from the earth-based receiver 70 (see FIG. 5B). The earth-based receiver 70 (see FIG. 5B) receives the data 72 (see FIG. 1) or information, such as the payload data transmission 79 (see FIGS. 1, 2), transmitted or communicated from the transmitter 78 (see FIGS. 1, 5B) coupled to the one or more payload processors 68a (see FIGS. 1, 5A) of the sensing system 12 (see FIG. 1) and system 10 (see FIG. 1).

The different components illustrated for the processor(s) 68 (see FIGS. 5A-5B) are not meant to provide architectural limitations to the manner in which different embodiments may be implemented. The different illustrative embodiments may be implemented in a processor or data processing system, including components in addition to and/or in place of, those illustrated for the processor(s) 68 (see FIGS. 5A-5B). Other components shown in FIGS. 5A-5B may be varied from the illustrative examples shown. The different embodiments may be implemented using any hardware device or system capable of running system logic, such as program code, computer software (e.g., analysis software 110 (see FIGS. 5A-5B), or another suitable system logic.

Figure 6:
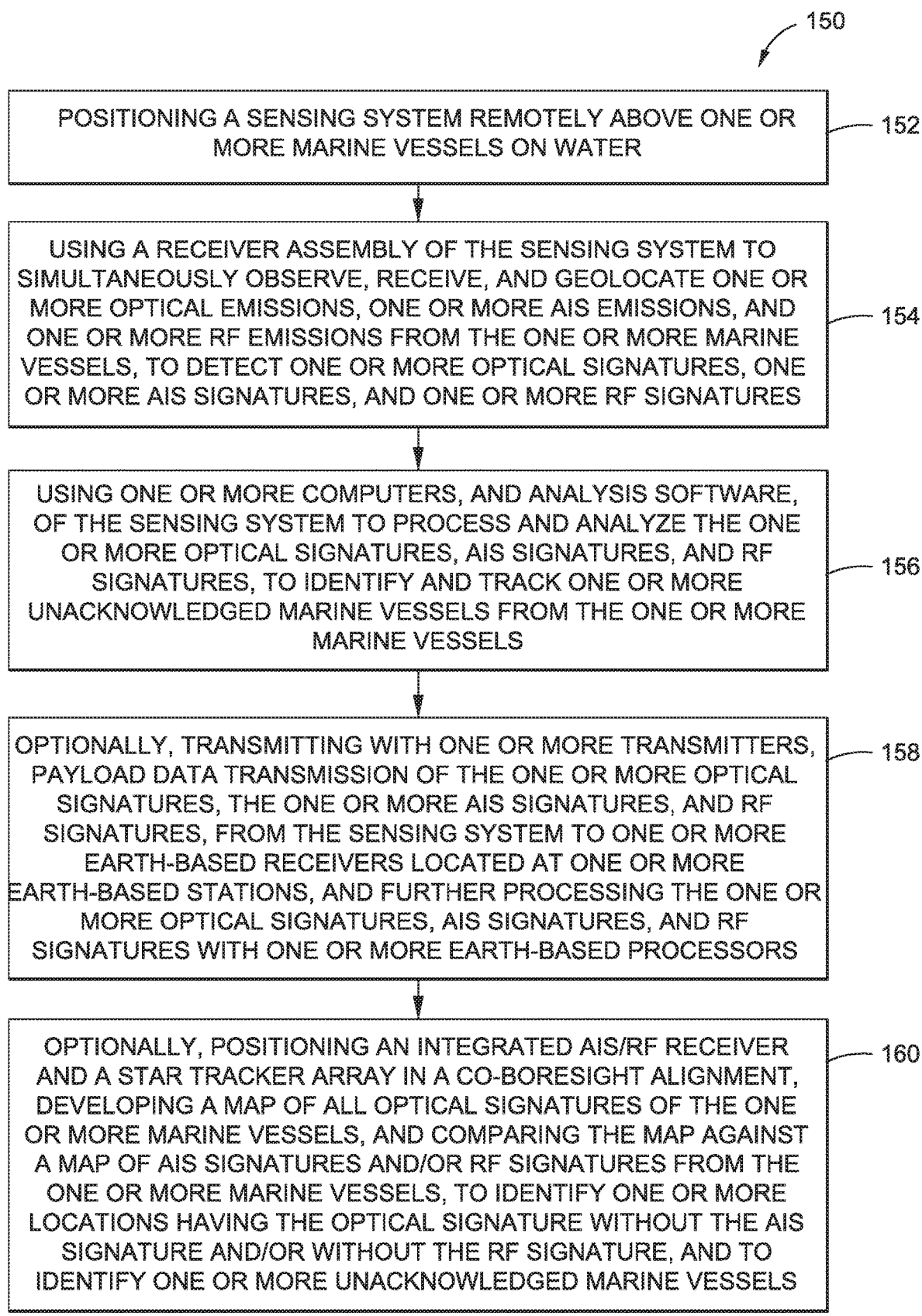
FIG. 6 is an illustration of a flow diagram of an embodiment of a method of the disclosure.

In another embodiment of the disclosure, there is provided a method 150 (see FIG. 6) for identifying and tracking one or more unacknowledged marine vessels 30b (see FIG. 1). FIG. 6 is an illustration of a flow diagram illustrating an exemplary embodiment of the method 150 of the disclosure.

Now referring to FIG. 6, as shown in FIG. 6, the method 150 comprises step 152 of positioning a sensing system 12 (see FIGS. 1, 2) remotely above one or more marine vessels 30 (see FIG. 2) on water 86 (see FIG. 2). Preferably, the sensing system 12 (see FIG. 2) is positioned in space 89 (see FIG. 2) or in air 88 (see FIG. 2) remotely above or over one or more marine vessels 30 (see FIG. 2) on water 86 (see FIG. 2), such as oceangoing or seagoing marine vessels, or other traveling marine vessels.

As discussed above, the sensing system 12 (see FIG. 1) of the system 10 (see FIG. 1) comprises one or more observation platforms 16 (see FIG. 1), each having a navigation system 20 (see FIG. 1), such as GPS 20a (see FIG. 1), or another suitable navigation system. The one or more observation platforms 16 (see FIG. 1) comprise one or more spaceborne observation platforms 22 (see FIG. 1), one or more airborne observation platforms 24 (see FIG. 1), or a combination thereof.

The sensing system 12 (see FIG. 1) further comprises one or more payloads 40 (see FIG. 1) coupled to the one or more observation platforms 16 (see FIG. 1). The one or more payloads 40 (see FIG. 1) comprise a receiver assembly 43 (see FIG. 1). The receiver assembly 43 (see FIG. 1) comprises one or more optical receivers 44 (see FIG. 1), one or more automatic identification system (AIS) receivers 52 (see FIG. 1), and one or more radio frequency (RF) receivers 60 (see FIG. 1). The sensing system 12 (see FIG. 1) further comprises one or more processors 68 (see FIGS. 1, 5A-5B), such as one or more computers 100 (see FIGS. 5A-5B), having an analysis software 110 (see FIGS. 5A-5B). The sensing system 12 (see FIG. 1) may further comprise one or more transmitters 78 (see FIG. 1).

The step 152 of positioning the sensing system 12 (see FIGS. 1, 2) remotely above the one or more marine vessels 30 (see FIG. 2) on water 86 (see FIG. 2) may further comprise using the sensing system 12 (see FIG. 1) with a plurality of spaceborne observation platforms 22 (see FIG. 1) comprising a satellite constellation 26b (see FIG. 1) to globally perform marine traffic tracking 28 (see FIG. 1) and to monitor marine traffic chokepoints 29 (see FIG. 1). The satellite constellation 26b (see FIG. 1) may comprise multiple small satellites 26 (see FIG. 1). In this embodiment, the sensing system 12 (see FIG. 1) comprises the satellite constellation 26b (see FIG. 1) with one or more payloads 40 (see FIG. 1) having the receiver assembly 43 (see FIG. 1) of one or more optical receivers 44 (see FIG. 1), one or more AIS receivers 52 (see FIG. 1), and one or more RF receivers 60 (see FIG. 1).

The satellite constellation 26b (see FIG. 1) preferably provides for global observation of the whole earth and allows for marine traffic tracking 28 (see FIG. 1) on a global basis by identifying, tracking, monitoring, and detecting optical signatures 46 (see FIG. 1), automatic identification system (AIS) signatures 56 (see FIG. 1), and radio frequency (RF) signatures 64 (see FIG. 1) of marine traffic, and in particular, at marine traffic chokepoints 29 (see FIG. 1). As used herein, "marine traffic chokepoint" means a narrow marine waterway (i.e., ocean, sea) passage, or channel between land portions that is used as a shipping lane or shipping route by a large amount of marine vessel traffic and that becomes backed up or bottlenecked when the marine vessel traffic travel through the narrow waterway passage. The marine traffic chokepoint 29 (see FIG. 1) typically ends up driving the marine vessel traffic. Thus, the sensing system 12 (see FIG. 1) may be used to track and monitor these marine traffic chokepoints 29 (see FIG. 1) on a global basis.

As shown in FIG. 6, the method 150 further comprises step 154 of using the receiver assembly 43 (see FIG. 1) of the sensing system 12 (see FIG. 1) to simultaneously observe, receive, and geolocate one or more optical emissions 50 (see FIG. 1), one or more automatic identification system (AIS) emissions 58 (see FIG. 1), and one or more radio frequency (RF) emissions 66 (see FIG. 1), from the one or more marine vessels 30 (see FIG. 1), in order to detect one or more optical signatures 46 (see FIG. 1), one or more automatic identification system (AIS) signatures 56 (see FIG. 1), and one or more radio frequency (RF) signatures 64 (see FIG. 1).

The step 154 (see FIG. 6) of using the receiver assembly 43 (see FIG. 1) of the sensing system 12 (see FIG. 1) to simultaneously observe, receive, and geolocate, may preferably further comprise using the one or more optical receivers 44 (see FIG. 1) comprising imaging devices 48 (see FIG. 1), comprising one or more of a star tracker 48a (see FIG. 1), a star tracker array 48b (see FIG. 1), a camera 48c (see FIG. 1), or another suitable imaging device 48 (see FIG. 1), to receive the one or more optical emissions 50 (see FIG. 1) comprising one or more of visible lights 50a (see FIG. 1), cabin lights 50b (see FIG. 1), running lights 50c (see FIG. 1), or another suitable optical emission 50 (see FIG. 1), on the one or more marine vessels 30 (see FIG. 1).

The step 154 (see FIG. 6) of using the receiver assembly 43 (see FIG. 1) of the sensing system 12 (see FIG. 1) to simultaneously observe, receive, and geolocate, may preferably further comprise using the one or more AIS receivers 52 (see FIG. 1) to receive one or more AIS emissions 58 (see FIG. 1) comprising one or more of an automatic identification system (AIS) signal beacon 58a (see FIG. 1), automatic identification system (AIS) signals 58b (see FIG. 1), or another suitable AIS emission 58 or signal, from the one or more marine vessels 30 (see FIG. 1).

The step 154 (see FIG. 6) of using the receiver assembly 43 (see FIG. 1) of the sensing system 12 (see FIG. 1) to simultaneously observe, receive, and geolocate, may preferably further comprise using the one or more RF receivers 60 (see FIG. 1) to receive one or more RF emissions 66 (see FIG. 1) comprising one or more of radio frequency (RF) signals 66a (see FIG. 1), marine radar signals 66b (see FIG. 1), marine radio frequency (RF) radio signals 66c (see FIG. 1), or another suitable RF emission 66 (see FIG. 1) or signal, from the one or more marine vessels 30 (see FIG. 1).

The step 154 (see FIG. 6) of using the receiver assembly 43 (see FIG. 1) of the sensing system 12 (see FIG. 1) to simultaneously observe, receive, and geolocate, may preferably further comprise simultaneously observing the one or more optical emissions 50 (see FIG. 1) and the one or more RF emissions 66 (see FIG. 1) from the one or more marine vessels 30 (see FIG. 1) on water 86 (see FIG. 2), to identify when a marine vessel 30 (see FIG. 1) changes status from an acknowledged marine vessel 30a (see FIG. 1) to an unacknowledged marine vessel 30b (see FIG. 1).

As shown in FIG. 6, the method 150 further comprises step 156 of using one or more computers 100 (see FIGS. 5A-5B), and the analysis software 110 (see FIGS. 5A-5B), of the sensing system 12 (see FIG. 1), to identify and track one or more unacknowledged marine vessels 30b (see FIG. 1) from the one or more marine vessels 30 (see FIG. 1).

The step 156 of using the one or more computers 100 (see FIGS. 5A-5B), and the analysis software 110 (see FIGS. 5A-5B), of the sensing system 12 (see FIG. 1) to process and analyze the one or more optical signatures 46 (see FIG. 1), the one or more AIS signatures 56 (see FIG. 1), and the one or more RF signatures 64 (see FIG. 1), and to identify and track the one or more unacknowledged marine vessels 30b (see FIG. 1), may preferably further comprise step 94 (see FIG. 4A) of identifying one or more locations 38 (see FIG. 1) having the optical signature 46 (see FIG. 1) without the AIS signature 56 (see FIG. 1) to obtain a first map 84d (see FIG. 4A) of potential unacknowledged marine vessels 30c (see FIG. 1). The first map 84d (see FIG. 4A) is comprised of a location dataset 76 (see FIG. 1) of one or more locations 38 (see FIG. 1) of the one or more marine vessels 30 (see FIG. 1), where the optical signature 46 (see FIG. 1) is detected but no AIS signature 56 (see FIG. 1) is detected.

The step 156 of using the one or more computers 100 (see FIGS. 5A-5B) and the analysis software 110 (see FIGS. 5A-5B) of the sensing system 12 (see FIG. 1) to process and analyze the one or more optical signatures 46 (see FIG. 1), the one or more AIS signatures 56 (see FIG. 1), and the one or more RF signatures 64 (see FIG. 1), and to identify and track the one or more unacknowledged marine vessels 30b (see FIG. 1), may preferably further comprise step 96 (see FIG. 4A) of identifying one or more locations 38 (see FIG. 1) having the RF signature 64 (see FIG. 1) without the AIS signature 56 (see FIG. 1) to obtain a second map 84e (see FIG. 4A) of potential unacknowledged marine vessels 30c (see FIG. 4A). The second map 84e (see FIG. 4A) is comprised of another location dataset 76 (see FIG. 1) of one or more locations 38 (see FIG. 1) of the one or more marine vessels 30 (see FIG. 1), where the RF signature 64 (see FIG. 1) is detected but no AIS signature 56 (see FIG. 1) is detected.

The step 156 of using the one or more computers 100 (see FIGS. 5A-5B) and the analysis software 110 (see FIGS. 5A-5B) of the sensing system 12 (see FIG. 1) to process and analyze the one or more optical signatures 46 (see FIG. 1), the one or more AIS signatures 56 (see FIG. 1), and the one or more RF signatures 64 (see FIG. 1), and to identify and track the one or more unacknowledged marine vessels 30b (see FIG. 1), may preferably further comprise step 97 (see FIG. 4A) of determining one or more locations 38 (see FIG. 1) present on both the first map 84d (see FIG. 4A) and the second map 84e (see FIG. 4A) to obtain a third map 84f (see FIG. 4A) identifying the one or more unacknowledged marine vessels 30b (see FIG. 1). The third map 84f (see FIG. 4A) is comprised of yet another location dataset 76 (see FIG. 1) of one or more locations 38 (see FIG. 1) of the one or more marine vessels 30 (see FIG. 1), where both the optical signature 46 (see FIG. 1) without the AIS signature 56 (see FIG. 1), and the RF signature 64 (see FIG. 1) without the AIS signature 56 (see FIG. 1), are detected. Determining the location dataset 76 (see FIG. 1) for the third map 84f (see FIG. 4A) may comprise comparing, correlating, and/or summing, with the analysis software 110 (see FIGS. 5A-5B), the one or more locations 38 (see FIG. 1) having the optical signature 46 (see FIG. 4) without the AIS signature 56 (see FIG. 4), and the one or more locations 38 (see FIG. 1) having the RF signature 64 (see FIG. 4) without the AIS signature 56 (see FIG. 4), to eliminate any false positives.

As shown in FIG. 6, the method 150 may further comprise collective steps 158 of optionally, transmitting with the one or more transmitters 78 (see FIG. 1), payload data transmission 79 (see FIGS. 1, 2) of, or relating to, the one or more optical signatures 46 (see FIG. 1), the one or more AIS signatures 56 (see FIG. 1), and the one or more RF signatures 64 (see FIG. 1), from the one or more payloads 40 (see FIG. 1) of the sensing system 12 (see FIG. 1) to one or more earth-based receivers 70 (see FIGS. 1, 2) located at one or more earth-based stations 14 (see FIGS. 1, 2), and further processing the one or more optical signatures 46 (see FIG. 1), the one or more AIS signatures 56 (see FIG. 1), and the one or more RF signatures 64 (see FIG. 1) with the one or more earth-based processors 68b (see FIG. 1), such as in the form of one or more computers 100 (see FIG. 5B).

As shown in FIG. 6, the method 150 may further comprise collective steps 160 of optionally, positioning an integrated AIS/RF receiver 80 (see FIGS. 1, 4B) and the optical receiver 44 (see FIG. 1), in the form of a star tracker array 48b (see FIGS. 1, 4B), (or a star tracker 48a (see FIG. 1), in a co-boresight alignment 82 (see FIG. 1), developing a map 84a (see FIG. 4B) of all optical signatures 46 (see FIG. 1), such as one or more optical signatures 46 (see FIG. 1), of the one or more marine vessels 30 (see FIG. 1) on water 86 (see FIG. 2), and comparing the map 84a (see FIG. 4B) against a map 84g (see FIG. 4B) of one or more AIS signatures 56 and/or one or more RF signatures 64 from the one or more marine vessels 30 (see FIG. 1) on water 86 (see FIG. 2), to identify one or more locations 38 (see FIG. 1) of the one or more marine vessels 30 (see FIG. 1) having the optical signature 46 (see FIG. 1) without the AIS signature 56 (see FIG. 1) and/or without the RF signature 64 (see FIG. 1), for example, one or more locations 38 (see FIG. 1) that are not transmitting from AIS signals 58b (see FIG. 1) or radio frequency (RF) signals 66a (see FIG. 1), and to identify one or more unacknowledged marine vessels 30b (see FIG. 1).

Figure 7:
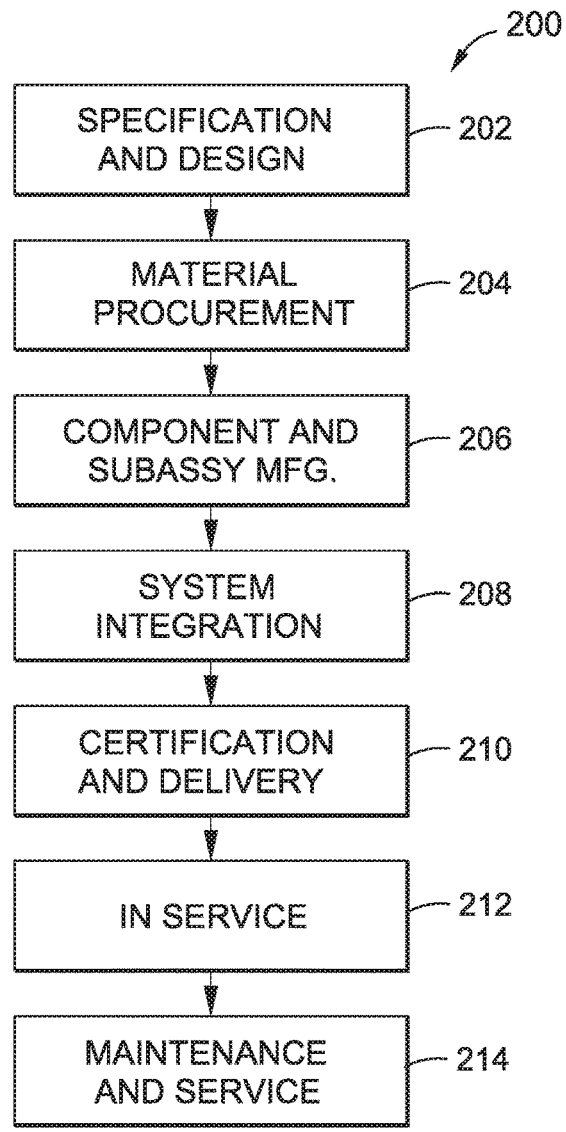
FIG. 7 is an illustration of a flow diagram of an embodiment of an aircraft manufacturing and service method.
Figure 8:
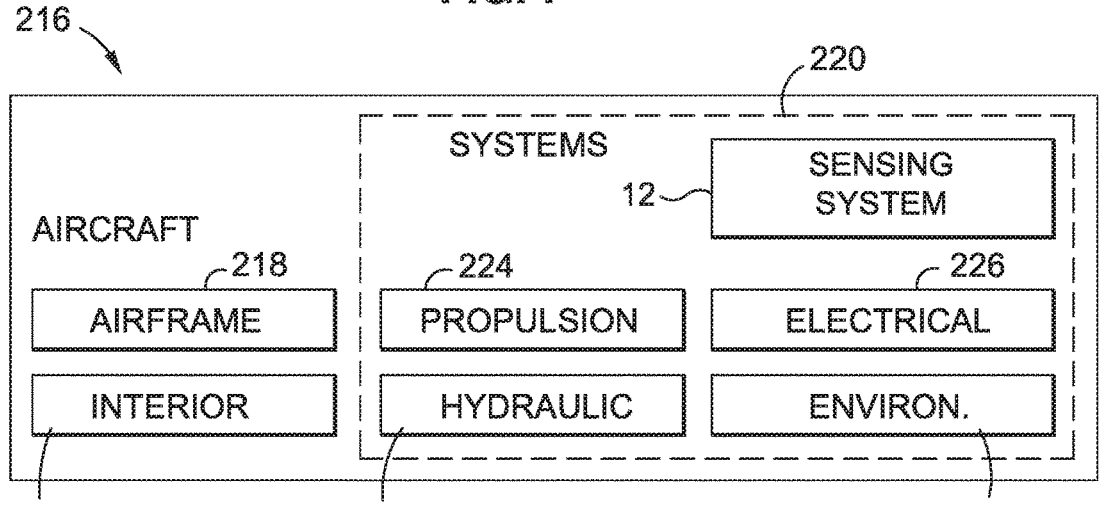
FIG. 8 is an illustration of a functional block diagram of an embodiment of an aircraft with a sensing system of the disclosure.

Referring now to FIGS. 7 and 8, FIG. 7 is an illustration of a flow diagram of an embodiment of an aircraft manufacturing and service method 200, and FIG. 8 is an illustration of a functional block diagram of an embodiment of an aircraft 216 with a sensing system 12 of the disclosure. Referring to FIGS. 7-8, embodiments of the disclosure may be described in the context of the aircraft manufacturing and service method 200, as shown in FIG. 7, and the aircraft 216, as shown in FIG. 8. During pre-production, the exemplary aircraft manufacturing and service method 200 (see FIG. 7) may include specification and design 202 (see FIG. 7) of the aircraft 216 (see FIG. 8) and material procurement 204 (see FIG. 7). During manufacturing, component and subassembly manufacturing 206 (see FIG. 7) and system integration 208 (see FIG. 7) of the aircraft 216 (see FIG. 8) takes place. Thereafter, the aircraft 216 (see FIG. 8) may go through certification and delivery 210 (see FIG. 7) in order to be placed in service 212 (see FIG. 7). While in service 212 (see FIG. 7) by a customer, the aircraft 216 (see FIG. 8) may be scheduled for routine maintenance and service 214 (see FIG. 7), which may also include modification, reconfiguration, refurbishment, and other suitable services.

Each of the processes of the aircraft manufacturing and service method 200 (see FIG. 7) may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may include an airline, leasing company, military entity, service organization, and other suitable operators.

As shown in FIG. 8, the aircraft 216 produced by the exemplary aircraft manufacturing and service method 200 (see FIG. 7) may include an airframe 218 with a plurality of systems 220 and an interior 222. As further shown in FIG. 8, examples of the systems 220 may include one or more of a propulsion system 224, an electrical system 226, a hydraulic system 228, an environmental system 220, and the sensing system 12 disclosed herein. Any number of other systems may be included. Although an aerospace example is shown, the principles of the disclosure may be applied to other industries, such as the automotive industry.

Methods and systems embodied herein may be employed during any one or more of the stages of the aircraft manufacturing and service method 200 (see FIG. 7). For example, components or subassemblies corresponding to component and subassembly manufacturing 206 (see FIG. 7) may be fabricated or manufactured in a manner similar to components or subassemblies produced while the aircraft 216 (see FIG. 8) is in service 212 (see FIG. 7). Also, one or more apparatus embodiments, method embodiments, or a combination thereof, may be utilized during component and subassembly manufacturing 206 (see FIG. 7) and system integration 208 (see FIG. 7), for example, by substantially expediting assembly of or reducing the cost of the aircraft 216 (see FIG. 8). Similarly, one or more of apparatus embodiments, method embodiments, or a combination thereof, may be utilized while the aircraft 216 (see FIG. 8) is in service 212 (see FIG. 7), for example and without limitation, to maintenance and service 214 (see FIG. 7).

Although disclosed embodiments of the system 10 (see FIG. 1), the sensing system 12 (see FIG. 1), and the method 150 (see FIG. 6) are described for use with identifying and tracking marine vessels 30 (see FIG. 1) and marine traffic using AIS and lack of an AIS signal or AIS signal beacon, embodiments of the system 10 (see FIG. 1), the sensing system 12 (see FIG. 1), and the method 150 (see FIG. 6) may also be used with other vessels or vehicles having different identification systems or beacons, other than AIS. For example, embodiments of the system 10 (see FIG. 1), the sensing system 12 (see FIG. 1), and the method 150 (see FIG. 6) may be used to identify and detect air traffic, such as aircraft, air vehicles, unmanned air vehicles (UAVs), helicopters, dirigibles, or other air vehicles with the use of an ACAS (airborne collision avoidance system) beacon or signal or similar signal, and an ACAS receiver or similar receiver, used in place of an AIS signal beacon or AIS signal, and AIS receiver, respectively.

Disclosed embodiments of the system 10 (see FIG. 1), the sensing system 12 (see FIG. 1), and the method 150 (see FIG. 6) provide for the identification and detection of one or more unacknowledged marine vessels 30b (see FIG. 1) via analysis of optical signatures 46 (see FIG. 1), AIS signatures 56 (see FIG. 1), and RF signatures 64 (see FIG. 1). Part of the novelty in the analysis includes a new way of using star trackers 48a (see FIG. 1) or star tracker arrays 48b (see FIG. 1), as optical receivers 44 (see FIG. 1) to observe and identify optical emissions 50, such as visible lights 50a (see FIG. 1), cabin lights 50b (see FIG. 1), running lights 50c (see FIG. 1), or other suitable optical emissions 50 (see FIG. 1), on one or more marine vessels 30 (see FIG. 1) and track the one or more marine vessels 30 (see FIG. 1) on water 86 (see FIG. 1). The optical receivers 44 (see FIG. 1), such as the star trackers 48a (see FIG. 1), are located on one or more payloads 40 (see FIG. 1) coupled to one or more observation platforms 16 (see FIG. 1) positioned remotely in air 88 (see FIG. 2) or in space 89 (see FIG. 2) above the one or more marine vessels 30 (see FIG. 1).

In addition, disclosed embodiments of the system 10 (see FIG. 1), the sensing system 12 (see FIG. 1), and the method 150 (see FIG. 6) solve the problem of identifying and tracking unacknowledged marine vessels 30b (see FIG. 1) on water 86 (see FIG. 2), that may not always use the AIS signal beacon 58a (see FIG. 1) or AIS signal 58b (see FIG. 1), such as when performing illegal activities such as human smuggling, illegal fishing, arms transportation, or other illegal activities. To discover unacknowledged marine vessels 30b (see FIG. 1) on water 86 (see FIG. 2), three primary observable signatures 92 (see FIG. 4A), including optical signatures 46 (see FIG. 1), AIS signatures 56 (see FIG. 1), and RF signatures 64 (see FIG. 1), of these marine vessels 30 (see FIG. 1) may be exploited. Disclosed embodiments of the system 10 (see FIG. 1), the sensing system 12 (see FIG. 1), and the method 150 (see FIG. 6) utilize observation techniques looking for RF signatures 64 (see FIG. 1) and optical signatures 46 (see FIG. 1) of these marine vessels 30 (see FIG. 1), while at sea or on the ocean.

Moreover, disclosed embodiments of the system 10 (see FIG. 1), the sensing system 12 (see FIG. 1), and the method 150 (see FIG. 6) simultaneously observe the RF emissions 66 (see FIG. 1) and the optical emissions 50 (see FIG. 1) from marine vessels 30 (see FIG. 1) or marine traffic to identify when a marine vessel 30 (see FIG. 1) changes status from an acknowledged marine vessel 30a (see FIG. 1) to an unacknowledged marine vessel 30b (see FIG. 1). Disclosed embodiments of the system 10 (see FIG. 1), the sensing system 12 (see FIG. 1), and the method 150 (see FIG. 6) provide a unique technique to reduce the location dataset 76 (see FIG. 1) to identify those marine vessels 30 (see FIG. 1) that are most likely unacknowledged marine vessels 30b (see FIG. 1).

Further, disclosed embodiments of the system 10 (see FIG. 1), the sensing system 12 (see FIG. 1), and the method 150 (see FIG. 6) identify outliers 74 (see FIG. 1) in the data 72 (see FIG. 1), where the RF emission 66 (see FIG. 1), such as a marine radar signal 66b (see FIG. 1) is present when an AIS emission 58, such as an AIS signal 58b (see FIG. 1), is not present, to identify potential unacknowledged marine vessels 30c (see FIG. 1). Moreover, disclosed embodiments of the system 10 (see FIG. 1), the sensing system 12 (see FIG. 1), and the method 150 (see FIG. 6) provide the ability to map all of the marine vessels 30 (see FIG. 1) and correlate the RF signatures 64 (see FIG. 1) to optical signatures 46 (see FIG. 1) to identify optical emissions 50 (see FIG. 1), such as visible lights 50a (see FIG. 1), not corresponding to the AIS emissions 58 (see FIG. 1), such as AIS signals 58b (see FIG. 1) and/or the RF emissions 66 (see FIG. 1), such as marine radar signals 66b (see FIG. 1). This correlation may be used to identify one or more unacknowledged marine vessels 30b (see FIG. 1).

In addition, disclosed embodiments of the system 10 (see FIG. 1), the sensing system 12 (see FIG. 1), and the method 150 (see FIG. 6) use an optical receiver 44 (see FIG. 1), an RF receiver 60 (see FIG. 1), and an AIS receiver 52 (see FIG. 1) together as an integrated solution, rather than using only an AIS receiver 52 that receives an AIS signal beacon 58a (see FIG. 1) or AIS signal 58b (see FIG. 1), such as with known systems and methods. For example, the optical signature 46 (see FIG. 1) and the RF signature 64 (see FIG. 1) may be integrated on a payload 40 (see FIG. 1) onboard the observation platform 16 (see FIG. 1).

In one embodiment of the system 10 (see FIG. 1), the sensing system 12 (see FIG. 1), and the method 150 (see FIG. 6), an integrated AIS/RF receiver 80 (see FIGS. 1, 4B) may be used with an optical receiver 44 (see FIG. 1), such as a star tracker array 48b (see FIGS. 1, 4B) or a star tracker 48a (see FIG. 1), in a co-boresight alignment 82 (see FIG. 1), to geolocate and correlate the AIS emissions 58 (see FIG. 1) and the RF emissions 66 (see FIG. 1). The integrated AIS/RF receiver 80 (see FIGS. 1, 4B) and star tracker array 48b (see FIGS. 1, 4B) or star tracker 48a (see FIG. 1), in co-boresight alignment 82 (see FIG. 1) point at the earth and may be used to detect optical signatures 46 (see FIG. 1) against the dark background 86b (see FIG. 2) of the water 86 (see FIG. 2), such as the ocean or sea. The star tracker array 48b (see FIG. 1) develops a map 84a (see FIG. 4B) of all optical signatures 46 (see FIG. 1) from optical emissions 50 (see FIG. 1), such as visible lights 50a (see FIG. 1), cabin lights 50b (see FIG. 1), running lights 50c (see FIG. 1), and/or other suitable lights or optical emissions, of the one or more marine vessels 30 (see FIG. 1). This map 84a (see FIG. 4B) may then be compared against the RF signatures 64 (see FIG. 1) to identify marine vessels 30 (see FIG. 1) that are not transmitting from the AIS signals 58b (see FIG. 1) and/or the marine radar signals 66b (see FIG. 1). This indicates an unacknowledged marine vessel 30b (see FIG. 1).

Further, disclosed embodiments of the system 10 (see FIG. 1), the sensing system 12 (see FIG. 1), and the method 150 (see FIG. 6) have advantages over known systems and methods, including such advantages as reduced uncertainty in tracking marine vessels 30 (see FIG. 1), including unacknowledged marine vessels 30b (see FIG. 1), improved technical performance by reducing the number of false positive identifications of unacknowledged marine vessels 30b (see FIG. 1), improved geolocation accuracy, and greater probability of correlation to identify unacknowledged marine vessels 30b (see FIG. 1), as compared to known systems and methods. Moreover, disclosed embodiments of the system 10 (see FIG. 1), the sensing system 12 (see FIG. 1), and the method 150 (see FIG. 6) may benefit law enforcement by assisting against illegal activities such as human smuggling, illegal fishing, arms transportation, or other illegal activities, and may provide benefits to maritime border control and maritime safety and security issues, such as anti-piracy, and search and rescue. In addition, disclosed embodiments of the system 10 (see FIG. 1) and the method 150 (see FIG. 6) may provide near-real-time data collection of the data 72 (see FIG. 1) of, or relating to, optical signatures 46 (see FIG. 1), AIS signatures 56 (see FIG. 1), and RF signatures 64 (see FIG. 1), from the optical emissions 50 (see FIG. 1), AIS emissions 58 (see FIG. 1) and RF emissions 66 (see FIG. 1), and delivery of the data 72 (see FIG. 1) transmitted or delivered from the payload(s) 40 (see FIG. 1) of the system 10 (see FIG. 1), to the earth-based station(s) 14 (see FIG. 1).

The use of star trackers 48a (see FIG. 1) or star tracker arrays 48b (see FIG. 1) to identify optical emissions 50 (see FIG. 1) on marine vessels 30 (see FIG. 1) provide a unique discriminator and solution, as compared to known systems and methods. The use of a star tracker 48a (see FIG. 1) or star tracker array 48b (see FIG. 1), along with the addition of RF emissions 66 (see FIG. 1), such as marine radar signals 66b (see FIG. 1), provides a much higher probability of correlation than known systems and methods.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. A system for identifying and tracking unacknowledged marine vessels, the system comprising:
   a sensing system comprising:
      one or more airborne observation platforms positioned in air remotely above one or more marine vessels on water, the one or more airborne observation platforms each having a navigation system and comprising one or more of an aircraft, an unmanned air vehicle (UAV), a high altitude UAV, and a dirigible; and
      one or more payloads coupled to each of the one or more airborne observation platforms, the one or more payloads comprising:
         a star tracker array configured to observe, geolocate, and receive optical emissions from the one or more marine vessels to detect optical signatures, the star tracker array developing a map of all the optical signatures from the optical emissions, and the optical emissions comprising one or more of visible lights, cabin lights, and running lights, on the one or more marine vessels;
         an integrated AIS/RF receiver comprising an automatic identification system (AIS) receiver combined with a radio frequency (RF) receiver, the AIS receiver configured to observe, geolocate, and receive automatic identification system (AIS) emissions from the one or more marine vessels to detect automatic identification system (AIS) signatures, and the (RF) receiver configured to receive radio frequency (RF) emissions from the one or more marine vessels to detect radio frequency (RF) signatures, wherein the integrated AIS/RF receiver develops a map of the AIS signatures and the RF signatures, and further wherein the integrated AIS/RF receiver is positioned in a co-boresight alignment with the star tracker array, the integrated AIS/RF receiver and the star tracker array in the co-boresight alignment and pointing in a same direction toward earth and toward the one or more marine vessels, to facilitate detection of the optical signatures against a dark background of the water; and
         at least one processor with an analysis software configured to process and analyze the optical signatures, the AIS signatures, and the RF signatures, to compare the map of the optical signatures against the map of the AIS signatures and the RF signatures, to identify one or more locations having the optical signatures without the AIS signatures and without the RF signatures, and to identify and track one or more of the unacknowledged marine vessels from the one or more marine vessels that are not transmitting from the AIS emissions or the RF emissions.

2. The system of claim 1 wherein the one or more payloads further comprise one or more transmitters configured to transmit payload data transmission for the optical signatures, the AIS signatures, and the RF signatures, from the one or more payloads, to one or more earth-based receivers located at one or more earth-based stations.

3. The system of claim 1 wherein the one or more payloads further comprise one or more of one or more transponders, one or more transceivers, and antennas.

4. The system of claim 1 wherein the one or more airborne observation platforms further comprise a power system, a control system, a propulsion system, and a telemetry and command system.

5. The system of claim 1 wherein the automatic identification system (AIS) receiver has a waveband range of from 30 MHz (MegaHertz) to 300 MHz (MegaHertz).

6. The system of claim 1 wherein the RF receiver has one of, a VHF (very high frequency) waveband range from 30 MHz (MegaHertz) to 300 MHz (MegaHertz), and a UHF (ultra high frequency) waveband range from 300 MHz (MegaHertz) to 3000 MHz (MegaHertz).

7. The system of claim 1 wherein the at least one processor with the analysis software is configured to map the one or more marine vessels and correlate the RF signatures to the optical signatures, to identify the optical emissions not corresponding to the AIS emissions or the RF emissions.

8. The system of claim 1 wherein the star tracker array comprises a charge-coupled device (CCD) based star tracker.

9. The system of claim 1 wherein the AIS emissions comprise one or more of an automatic identification system (AIS) signal beacon and automatic identification system (AIS) signals, from the one or more marine vessels.

10. The system of claim 1 wherein the RF emissions comprise one or more of radio frequency (RF) signals, marine radar signals, and marine radio frequency (RF) radio signals, from the one or more marine vessels.

11. A system for identifying and tracking unacknowledged marine vessels via analysis of optical signatures, automatic identification system (AIS) signatures, and radio frequency (RF) signatures, the system comprising:
    a sensing system comprising:
       one or more airborne observation platforms positioned in air remotely above one or more marine vessels on water, the one or more airborne observation platforms each having a navigation system, and comprising one or more of an aircraft, an unmanned air vehicle (UAV), a high altitude UAV, and a dirigible; and
       one or more payloads coupled to the one or more airborne observation platforms, the one or more payloads comprising:
          one or more star tracker arrays each configured to observe, geolocate, and receive optical emissions from the one or more marine vessels to detect the optical signatures, the one or more star tracker arrays developing a map of all the optical signatures from the optical emissions, and the optical emissions comprising one or more of visible lights, cabin lights, and running lights, on the one or more marine vessels;
          an integrated AIS/RF receiver comprising one or more automatic identification system (AIS) receivers configured to observe, geolocate, and receive automatic identification system (AIS) emissions from the one or more marine vessels to detect the AIS signatures, and further comprising one or more radio frequency (RF) receivers configured to receive radio frequency (RF) emissions from the one or more marine vessels to detect the RF signatures, wherein each of the one or more AIS receivers is combined with each of the one or more RF receivers, and further wherein the integrated AIS/RF receiver develops a map of the AIS signatures and the RF signatures, and further wherein the integrated AIS/RF receiver is positioned in a co-boresight alignment with one of the one or more star tracker arrays, the integrated AIS/RF receiver and the star tracker array in the co-boresight alignment and pointing in a same direction toward earth and toward the one or more marine vessels, to facilitate detection of the optical signatures against a dark background of the water; and one or more transmitters configured to transmit payload data transmission for the optical signatures, the AIS signatures, and the RF signatures, from the one or more payloads of the sensing system;

one or more earth-based stations having one or more earth-based receivers configured to receive the payload data transmission from the one or more payloads of the sensing system; and one or more computers with an analysis software, configured to process and analyze the optical signatures, the AIS signatures, and the RF signatures, to compare the map of the optical signatures against the map of the AIS signatures and the RF signatures, to identify one or more locations having the optical signatures without the AIS signatures and without the RF signatures, and to identify and track one or more of the unacknowledged marine vessels from the one or more marine vessels that are not transmitting from the AIS emissions or the RF emissions.

12. The system of claim 11 wherein the one or more payloads further comprise one or more of one or more transponders, one or more transceivers, and antennas.

13. The system of claim 11 wherein the MS emissions comprise one or more of an automatic identification system (AIS) signal beacon and automatic identification system (AIS) signals, from the one or more marine vessels, and wherein the RF emissions comprise one or more of radio frequency (RF) signals, marine radar signals, and marine radio frequency (RF) radio signals, from the one or more marine vessels.

14. A computer implemented method for identifying and tracking unacknowledged marine vessels, the method comprising the steps of:

positioning a sensing system remotely above one or more marine vessels on water, the sensing system comprising:

one or more airborne observation platforms positioned in air, each having a navigation system, the one or more airborne observation platforms comprising one or more of an aircraft, an unmanned air vehicle (UAV), a high altitude UAV, and a dirigible; and one or more payloads coupled to each of the one or more airborne observation platforms, the one or more payloads comprising a receiver assembly comprising a star tracker array, and an integrated AIS/RF receiver comprising an automatic identification system (AIS) receiver combined with a radio frequency (RF) receiver, and the one or more payloads further comprising one or more computers having an analysis software, and one or more transmitters;

positioning the integrated AIS/RF receiver and the star tracker array in a co-boresight alignment, wherein the integrated AIS/RF receiver and the star tracker array are in the co-boresight alignment and pointing in a same direction toward earth and toward the one or more marine vessels, to facilitate detection of one or more optical signatures against a dark background of the water;

using the receiver assembly of the sensing system to simultaneously observe, receive, and geolocate one or more optical emissions comprising one or more of visible lights, cabin lights, and running lights, on the one or more marine vessels, one or more automatic identification system (AIS) emissions, and one or more radio frequency (RF) emissions, from the one or more marine vessels, to detect the one or more optical signatures, one or more automatic identification system (AIS) signatures, and one or more radio frequency (RF) signatures;

using the star tracker array to develop a map of the one or more optical signatures from the one or more optical emissions;

using the integrated AIS/RF receiver to develop a map of the one or more AIS signatures and the one or more RF signatures; and using the one or more computers and the analysis software of the sensing system to process and analyze the one or more optical signatures, the one or more automatic identification system (AIS) signatures, and the one or more radio frequency (RF) signatures, to compare the map of the one or more optical signatures against the map of the one or more AIS signatures and the one or more RF signatures, to identify one or more locations having the one or more optical signatures without the one or more AIS signatures and without the one or more RF signatures, and to identify and track one or more of the unacknowledged marine vessels from the one or more marine vessels that are not transmitting from the one or more AIS emissions or the one or more RF emissions.

15. The method of claim 14 further comprising the steps of transmitting with the one or more transmitters, payload data transmission of the one or more optical signatures, the one or more AIS signatures, and the one or more RF signatures, from the sensing system to one or more earth-based receivers located at one or more earth-based stations, and further processing the one or more optical signatures, the one or more AIS signatures, and the one or more RF signatures with one or more earth-based processors.

16. The method of claim 14 wherein the step of using the one or more computers and the analysis software of the sensing system to process and analyze the one or more optical signatures, the one or more MS signatures, and the one or more RF signatures further comprises identifying one or more outliers in data transmitted from the one or more payloads of the sensing system, including where an RF signal is present, when an AIS signal is not present.

17. The method of claim 14 wherein the step of using the receiver assembly to simultaneously observe, receive, and geolocate further comprises:

using the AIS receiver to receive the one or more AIS emissions comprising one or more of an automatic identification system (AIS) signal beacon and automatic identification system (AIS) signals, from the one or more marine vessels; and using the RF receiver to receive the one or more RF emissions comprising one or more of radio frequency (RF) signals, marine radar signals, and marine radio frequency (RF) radio signals, from the one or more marine vessels.

18. The method of claim 14 wherein the step of using the receiver assembly to simultaneously observe, receive, and geolocate further comprises simultaneously observing the one or more optical emissions and the one or more RF emissions from the one or more marine vessels on the water, to identify when the one or more marine vessels change status from an acknowledged marine vessel to the unacknowledged marine vessel.

19. The method of claim 14 wherein the step of using the one or more computers and the analysis software to process and analyze the one or more optical signatures, the one or more AIS signatures, and the one or more RF signatures, and to identify and track the one or more unacknowledged marine vessels, further comprises the steps of:
- identifying the one or more locations having the one or more optical signatures without the one or more AIS signatures, to obtain a first map of potential unacknowledged marine vessels;
- identifying one or more locations having the one or more RF signatures without the one or more AIS signatures, to obtain a second map of potential unacknowledged marine vessels; and
- determining one or more locations present on both the first map and the second map, to obtain a third map identifying the one or more unacknowledged marine vessels.

20. The method of claim 14 wherein the step of positioning the sensing system remotely above the one or more marine vessels on the water further comprises using the sensing system with the one or more payloads further comprising one or more of one or more transponders, one or more transceivers, and antennas.

* * * * *